United States Patent
Nakashima et al.

(10) Patent No.: US 8,873,485 B2
(45) Date of Patent: Oct. 28, 2014

(54) MOBILE STATION APPARATUS, BASE STATION APPARATUS, COMMUNICATION SYSTEM, COMMUNICATION METHOD AND CONTROL PROGRAM

(75) Inventors: Daiichiro Nakashima, Osaka (JP); Yasuhiro Hamaguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 121 days.

(21) Appl. No.: 13/378,677

(22) PCT Filed: Apr. 23, 2010

(86) PCT No.: PCT/JP2010/057265
§ 371 (c)(1),
(2), (4) Date: Jan. 19, 2012

(87) PCT Pub. No.: WO2010/146938
PCT Pub. Date: Dec. 23, 2010

(65) Prior Publication Data
US 2012/0106490 A1    May 3, 2012

(30) Foreign Application Priority Data

Jun. 17, 2009  (JP) ................................. 2009-144704

(51) Int. Cl.
H04W 72/04    (2009.01)
H04W 52/42    (2009.01)
H04W 88/02    (2009.01)

(52) U.S. Cl.
CPC ................ *H04W 52/42* (2013.01); *Y02B 60/50* (2013.01); *H04W 88/02* (2013.01)
USPC ......................................................... 370/329

(58) Field of Classification Search
CPC .................................. H04W 4/16; H04W 4/02
USPC ................. 370/225, 249, 310–311, 328–329; 455/422.1–460, 464, 509, 524, 525
See application file for complete search history.

(56) References Cited

U.S. PATENT DOCUMENTS

| | | | |
|---|---|---|---|
| 6,236,864 B1* | 5/2001 | McGowan et al. | 455/522 |
| 2003/0137951 A1* | 7/2003 | Otsuka et al. | 370/328 |
| 2004/0266469 A1* | 12/2004 | Hayashi et al. | 455/522 |
| 2005/0026614 A1* | 2/2005 | Otsuka et al. | 455/436 |

(Continued)

OTHER PUBLICATIONS

LG Electronics, "PUCCH piggybacking onto PUSCH in case of transmit power limitation", 3GPP TSG RAN WG1 #56, R1-090654, Feb. 9-13, 2009, Athens, Greece.

(Continued)

*Primary Examiner* — Nicholas Jensen
*Assistant Examiner* — Berhanu Belete
(74) *Attorney, Agent, or Firm* — Birch, Stewart, Kolasch & Birch, LLP

(57) ABSTRACT

An antenna for transmission of signals in respective element frequency bands is controlled to reduce power consumption and transmit a good quality signal. A mobile station apparatus performs wireless communication with a base station apparatus using a plurality of element frequency bands having a predetermined frequency bandwidth. The mobile station apparatus includes: a plurality of transmission sections having an antenna and power amplifier; a transmission processing section generating a transmission signal and outputting the signal to at least one of the transmission sections based on information indicating a first transmission mode in which signals are transmitted using a single transmission antenna and a second transmission mode in which signals are transmitted using different transmission antennas respectively.

12 Claims, 12 Drawing Sheets

(56) References Cited

U.S. PATENT DOCUMENTS

| | | | |
|---|---|---|---|
| 2006/0135195 A1* | 6/2006 | Leinonen et al. | 455/550.1 |
| 2007/0117582 A1* | 5/2007 | Ohkubo et al. | 455/522 |
| 2009/0147748 A1* | 6/2009 | Ofuji et al. | 370/330 |
| 2009/0325627 A1* | 12/2009 | Lee | 455/522 |
| 2010/0182966 A1* | 7/2010 | Kishiyama et al. | 370/329 |
| 2010/0240352 A1* | 9/2010 | Suri et al. | 455/419 |
| 2010/0304785 A1* | 12/2010 | Marlett et al. | 455/552.1 |
| 2011/0255428 A1* | 10/2011 | Park et al. | 370/252 |
| 2012/0044849 A1* | 2/2012 | Farmanbar et al. | 370/312 |

OTHER PUBLICATIONS

LG Electronics, "Uplink multiple channel transmission in case of UE transmit power limitation", 3GPP TSG RAN WG1#56, R1-090655, Feb. 9-13, 2009, Athens, Greece.

MCC Support, "Final Report of 3GPP TSG Ran WG1 #58bis v1.0.0", 3GPP TSG RAN WG1 Meeting #59, R1-094421, Nov. 9-13, 2009, Jeju, South Korea.

Motorola, "Approaches to Assess Uplink Transmission Enhancements for LTE-Advanced", TSG-RAN WG1 #54, R1-083226, Aug. 18-22, 2008, Jeju, South Korea.

Motorola, "LTE-Advanced; UE TX characteristics", 3GPP TSG-RAN4 Meeting #50bis, R4-091366, Mar. 23-27, 2009, Soeul, Korea.

Nokia Siemens Networks, Nokia, "PUSCH Power Control for LTE-Advanced", 3GPP TSG RAN WG1 #56 Meeting, R1-090738, Feb. 9-13, 2009, Athens, Greece.

Panasonic, "Uplink multiple access schemes for multiple component carriers", 3GPP TSG RAN WG1 Meeting #55, R1-084226, Nov. 10-14, 2008, Prague, Czech Republic.

Research in Motion UK Limited, "Uplink Power Control for Carrier Aggregation", 3GPP TSG RAN WG1 Meeting #58, R1-093297, Aug. 24-28, 2009, Shenzhen, China.

Samsung, "UL Transmission Power Control in LTE-A", 3GPP TSG RAN WG1 #56bis, R1-091250, Mar. 23-27, 2009, Seoul, Korea.

Sharp, "The Benefits of One PA Mode for UEs Supporting Multiple PAs", 3GPP TSG-RAN WG1#57bis, R1-092339, Jun. 29- Jul. 3, 2009, Los Angeles, CA, U.S.A.

Sharp, "Way Forward for Transmission over Multiple Component Carriers with Multiple PAs", 3GPP TSG-RAN WG1#59bis, R1-100163, Jan. 18-22, 2010, Valencia, Spain.

Ericsson, "Impact of Carrier Aggregation on the L2 protocol architecture for LTE Rel-10", 3GPP TSG-RAN WG2 #66 Tdoc R2-092957, San Francisco, USA May 4-8, 2009.

* cited by examiner

| RADIO RESOURCE ALLOCATION INFORMATION | MODULATION SCHEME CODING RATE | RETRANSMI-SSION PARAMETER | TRANSMISSION POWER CONTROL VALUE | CRC + MOBILE STATION IDENTIFIER |

US 8,873,485 B2

MOBILE STATION APPARATUS, BASE STATION APPARATUS, COMMUNICATION SYSTEM, COMMUNICATION METHOD AND CONTROL PROGRAM

TECHNICAL FIELD

The present invention relates to a technology in which a base station apparatus and a mobile station apparatus perform wireless communication using a plurality of element frequency bands having predetermined frequency bandwidths.

BACKGROUND ART

<UL TPC (Uplink Transmit Power Control)>

In EUTRA (evolved universal terrestrial radio access; hereinafter referred to as "EUTRA"), transmission power control is applied in an uplink. In the transmission power control in the uplink of the EUTRA, the average transmission power of an SC-FDMA symbol is controlled, and both an open loop transmission power control method and a closed loop transmission power control method are used.

<Component Carrier Aggregation>

In the 3GPP (3rd generation partnership project), the examination of the 4th generation (hereinafter referred to as the "4G") radio access system (advanced EUTRA; hereinafter referred to as "A-EUTRA") and the 4G network (advanced EUTRAN) of cellular mobile communication is started.

In the A-EUTRA, supporting a frequency band wider than the EUTRA and ensuring compatibility with the EUTRA are being examined, and it is examined in the A-EUTRA that base station apparatuses constitute a wireless communication system from a plurality of element frequency bands (also referred to as "frequency band aggregation", spectrum aggregation or carrier aggregation) with the frequency band of the EUTRA as one unit (hereinafter referred to as an element frequency band; also referred to as a carrier component or a component carrier). The base station apparatus performs communication with a mobile station apparatus compatible with the EUTRA using any one of element frequency bands, and performs communication with a mobile station apparatus compatible with the A-EUTRA using one or more element frequency bands.

In the A-EUTRA, it is suggested that, in an uplink, an N×DFT (discrete Fourier transform)-S-OFDM (orthogonal frequency division multiplexing) system be applied (for example, refer to non-patent document 1). The N×DFT-S-OFDM system is a system in which a DFT-S-OFDM system is used in each element frequency band, mobile station apparatuses transmit signals using a plurality of element frequency bands and a base station apparatus receives the signals.

Non-patent document 1: 3GPP TSG RAN1 #55, Prague, Czech Republic, Nov. 10-14, 2008, R1-084226 "uplink multiple access schemes for multiple component carriers"

DISCLOSURE OF THE INVENTION

When, in the A-EUTRA, the mobile station apparatuses use radio resources in a plurality of element frequency bands to transmit signals, if the mobile station apparatuses attempt to achieve, in each of element frequency bands, the same communication quality (such as reception quality and a communication speed) as in the EUTRA, it is necessary to use a large amount of transmission power as compared with a case where signals are transmitted using a radio resource in at least one of the element frequency bands.

Although the mobile station apparatus uses a power amplifier to power-amplify and transmit the signal, if the input value of the signal into the power amplifier exceeds the capacity of the power amplifier, the waveform of the transmission signal is distorted and thus the mobile station apparatus cannot transmit an appropriate signal. Hence, it is necessary to set the upper limit value of the transmission power and properly control the average input value of the signal into the power amplifier. On the other hand, even when the mobile station apparatus uses the set upper limit value of the transmission power to transmit the signal, the transmission power necessary for transmission of the signal is insufficient and thus it is disadvantageously impossible to achieve appropriate communication quality.

In terms of the consumption power of the mobile station apparatus, it is preferable to operate as few power amplifiers as possible and transmit the signal.

The present invention is made in view of the foregoing; an object of the present invention is to provide a mobile station apparatus, a base station apparatus, a communication system, a communication method and a control program in which, in a wireless communication system using a plurality of element frequency bands, a transmission antenna used for transmission of a signal in each of the element frequency bands is controlled and thus power consumption can be reduced and a signal of communication quality suitable for the wireless communication system can be transmitted.

(1) To achieve the above object, the present invention provides the following means. Specifically, there is provided a mobile station apparatus that performs wireless communication with a base station apparatus using a plurality of element frequency bands having a predetermined frequency bandwidth, the mobile station apparatus including: a plurality of transmission sections that includes a transmission antenna and a power amplifier; and a transmission processing section that generates a transmission signal using a radio resource of the plurality of element frequency bands, and outputs the generated transmission signal to at least one of the transmission sections based on information indicating any one of a first transmission mode in which and signals in the respective element frequency bands are transmitted using a single transmission antenna and a second transmission mode in which signals in the respective element frequency bands are transmitted using different transmission antennas respectively, wherein the transmission signal is wirelessly transmitted to the base station apparatus in any one of the first transmission mode and the second transmission mode.

Since, as described above, in the present invention, the transmission signal can be wirelessly transmitted to the base station apparatus in any one of the first transmission mode and the second transmission mode, the mobile station apparatus can control the number of antennas used according to the state of the transmission signal, and can transmit a signal of communication quality suitable for a wireless communication system.

(2) The mobile station apparatus of the present invention further includes a control section that measures a remaining transmission power of the plurality of power amplifiers, wherein the transmission section wirelessly transmits information indicating the remaining transmission power to the base station apparatus.

Since, as described above, the mobile station apparatus wirelessly transmits, to the base station apparatus, information indicating the remaining transmission power of a plurality of power amplifiers, the base station apparatus can select the transmission mode based on the remaining transmission power of the mobile station apparatus.

(3) The mobile station apparatus of the present invention further includes a transmission power control section that performs, on the respective element frequency bands, transmission power control corresponding to the first transmission mode or the second transmission mode.

Since, as described above, the mobile station apparatus performs, on the respective element frequency bands, transmission power control corresponding to the first transmission mode or the second transmission mode, it is possible to control the number of antennas used for the transmission and perform transmission power control as in the case of the EUTRA. Thus, it is possible to achieve communication that maintains communication quality and that reduces power consumption.

(4) In the mobile station apparatus of the present invention, the transmission power control section sets an upper limit value of average transmission power of the respective power amplifiers to a different value according to the first transmission mode or the second transmission mode.

Since, as described above, an upper limit value of average transmission power of the respective power amplifiers is set to a different value according to the first transmission mode or the second transmission mode, an input value to the power amplifier within the transmission RF section can be set to an appropriate value for changes in the PAPR produced by a difference between a single carrier signal and a multicarrier signal.

(5) In the mobile station apparatus of the present invention, when, in the first transmission mode, the transmission signal is wirelessly transmitted to the base station apparatus, the transmission power control section sets the upper limit value of the average transmission power to be smaller than that in the second transmission mode.

Since, as described above, when, in the first transmission mode, the transmission signal is wirelessly transmitted to the base station apparatus, the upper limit value of the average transmission power is set to be smaller than that in the second transmission mode, an input value to the power amplifier within the transmission RF section can be set to an appropriate value. In other words, it is possible to reduce conditions in which, on an increase in the PAPR produced in a multicarrier signal in the N×DFT-S-OFDM system like the first transmission mode, an extra amount of control is performed as compared with the second transmission mode, and in which the input value to the power amplifier within the transmission RF section exceeds the capacity of the power amplifier.

(6) The mobile station apparatus of the present invention, further includes a control section that selects the first transmission mode when, in scrambling included in downlink control information and applied to a cyclic redundancy check, a scrambling code applied to the downlink control information on each of the element frequency bands received from the base station apparatus is common in the respective element frequency bands, and that, on the other hand, selects the second transmission mode when the scrambling code is different in the respective element frequency bands, wherein the transmission signal is wirelessly transmitted to the base station apparatus in any one of the selected first transmission mode and second transmission mode.

As described above, depending on whether the scrambling code included in the downlink control information and applied to the cyclic redundancy check is common or different, the transmission mode is selected, and thus it is possible to transmit information on the transmission mode using the downlink control channel without use of the downlink shared channel.

(7) The mobile station apparatus of the present invention, further includes a control section that selects the first transmission mode when a total of average transmission powers set on the respective element frequency bands does not exceed the maximum power of any one of the power amplifiers, and that, on the other hand, selects the second transmission mode when the total of average transmission powers exceeds the maximum power of any one of the power amplifiers, wherein the transmission signal is wirelessly transmitted to the base station apparatus in any one of the selected first transmission mode and second transmission mode.

As described above, the first transmission mode is selected when the total of average transmission powers set on the respective element frequency bands does not exceed the maximum power of any one of the power amplifiers whereas the second transmission mode is selected when the total of the average transmission powers exceeds the maximum power of any one of the power amplifiers. Thus, it is possible to perform appropriate power control and set the number of transmission antennas such that the number of transmission antennas is minimized. In this way, it is possible to reduce power consumption.

(8) According to the present invention, there is provided a base station apparatus that performs wireless communication with a mobile station apparatus using a plurality of element frequency bands having a predetermined frequency bandwidth, the base station apparatus comprising: a reception processing section that receives a signal transmitted from the mobile station apparatus using a radio resource of the plurality of element frequency bands; a base station side control section that selects, based on a parameter with respect to transmission power notified from the mobile station apparatus, any one of a first transmission mode in which signals in the respective element frequency bands are transmitted using a single transmission antenna and a second transmission mode in which signals in the respective element frequency bands are transmitted using different transmission antennas respectively; and a base station side transmission section that wirelessly transmits, to the mobile station apparatus, information indicating any one of the selected first transmission mode and second transmission mode.

As described above, the base station apparatus selects any one of a first transmission mode in which signals in the respective element frequency bands are transmitted with a single transmission antenna and a second transmission mode in which signals in the respective element frequency bands are transmitted with different transmission antennas respectively, and thus it is possible to transmit information indicating the transmission mode to the mobile station apparatus. The mobile station apparatus can control the number of antennas used based on this information and transmit a signal of communication quality suitable for a wireless communication system.

(9) In the base station apparatus of the present invention, the parameter with respect to the transmission power is a remaining transmission power of a plurality of power amplifiers included in the mobile station apparatus.

Since, as described above, the parameter with respect to the transmission power is a remaining transmission power of a plurality of power amplifiers, it is possible to control the transmission power in the range of power that can be handled by the power amplifier.

(10) In the base station apparatus of the present invention, the control section selects the first transmission mode when a total of average transmission powers for the plurality of element frequency bands set based on the remaining transmission power in the mobile station apparatus does not exceed the maximum power of any one of the power amplifiers whereas the control section selects the second transmission mode when the total of the average transmission powers exceeds the maximum power of any one of the power amplifiers.

As described above, the first transmission mode is selected when a total of average transmission powers on the plurality of element frequency bands set based on the remaining transmission power in the mobile station apparatus does not exceed the maximum power of any one of the power amplifiers whereas the second transmission mode is selected when the total of the average transmission powers exceeds the maximum power of any one of the power amplifiers, and thus it is possible to set the number of transmission antennas such that the number of transmission antennas is minimized. In this way, it is possible to reduce power consumption.

(11) According to the present invention, there is provided a communication system in which a mobile station apparatus and a base station apparatus perform wireless communication using a plurality of element frequency bands having a predetermined frequency bandwidth, wherein the base station apparatus comprises: a reception processing section that receives a signal transmitted from the mobile station apparatus using a radio resource of the plurality of element frequency bands; a base station side control section that selects any one of a first transmission mode in which signals in the respective element frequency bands are transmitted using a single transmission antenna and a second transmission mode in which signals in the respective element frequency bands are transmitted using different transmission antennas respectively, based on a parameter with respect to transmission power notified from the mobile station apparatus; and a base station side transmission section that wirelessly transmits, to the mobile station apparatus, information indicating any one of the selected first transmission mode and second transmission mode, wherein the mobile station apparatus comprises: a plurality of transmission sections including a transmission antenna and a power amplifier; and a transmission processing section that outputs the generated transmission signal to at least one of the transmission sections based on information indicating any one of the first transmission mode and second transmission mode, and wherein the mobile station apparatus wirelessly transmits, to the base station apparatus, the transmission signal in any one of the first transmission mode and the second transmission mode.

Since, as described above, the mobile station apparatus wirelessly transmits the transmission signal to the base station apparatus in any one of the first transmission mode and the second transmission mode, the mobile station apparatus can control the number of antennas used according to the state of the transmission signal, and can transmit a signal of communication quality suitable for a wireless communication system.

(12) According to the present invention, there is provided a communication method using a communication system in which a mobile station apparatus and a base station apparatus perform wireless communication using a plurality of element frequency bands having a predetermined frequency bandwidth, in which the base station apparatus includes the steps of: in the base station apparatus, receiving a signal transmitted from the mobile station apparatus using a radio resource of the plurality of element frequency bands; selecting, based on a parameter with respect to transmission power notified from the mobile station apparatus, any one of a first transmission mode in which signals in the respective element frequency bands are transmitted using a single transmission antenna and a second transmission mode in which signals in the respective element frequency bands are transmitted using different transmission antennas respectively; and wirelessly transmitting, to the mobile station apparatus, information indicating any one of the selected first transmission mode and second transmission mode, and in the mobile station apparatus, outputting the generated transmission signal to at least one of the transmission sections based on information indicating any one of the first transmission mode and second transmission mode, and wirelessly transmitting, to the base station apparatus, the transmission signal in any one of the first transmission mode and the second transmission mode.

Since, as described above, the mobile station apparatus wirelessly transmits the transmission signal to the base station apparatus in any one of the first transmission mode and the second transmission mode, the mobile station apparatus can control the number of antennas used according to the state of the transmission signal, and can transmit a signal of communication quality suitable for a wireless communication system.

(13) According to the present invention, there is provided a control program of a mobile station apparatus that performs wireless communication with a base station apparatus using a plurality of element frequency bands having a predetermined frequency bandwidth, the control program converting a series of processing steps into commands so as to allow a computer to read and execute them, the processing comprising: processing in which a transmission processing section generates a transmission signal using a radio resource of the plurality of element frequency bands and outputs the generated transmission signal to at least one of the transmission sections, based on information indicating any one of a first transmission mode in which signals in the respective element frequency bands are transmitted using a single transmission antenna and a second transmission mode in which signals in the respective element frequency bands are transmitted using different transmission antennas respectively, and processing in which a transmission section wirelessly transmits the transmission signal to the base station apparatus in any one of the first transmission mode and the second transmission mode.

Since, as described above, the mobile station apparatus wirelessly transmits the transmission signal to the base station apparatus in any one of the first transmission mode and the second transmission mode, the mobile station apparatus can control the number of antennas used according to the state of the transmission signal, and can transmit a signal of communication quality suitable for a wireless communication system.

According to the present invention, in a wireless communication system using a plurality of element frequency bands, a signal of communication quality suitable for the wireless communication system can be transmitted while power consumption is being reduced.

BEST MODES FOR CARRYING OUT THE INVENTION

Figure 1:
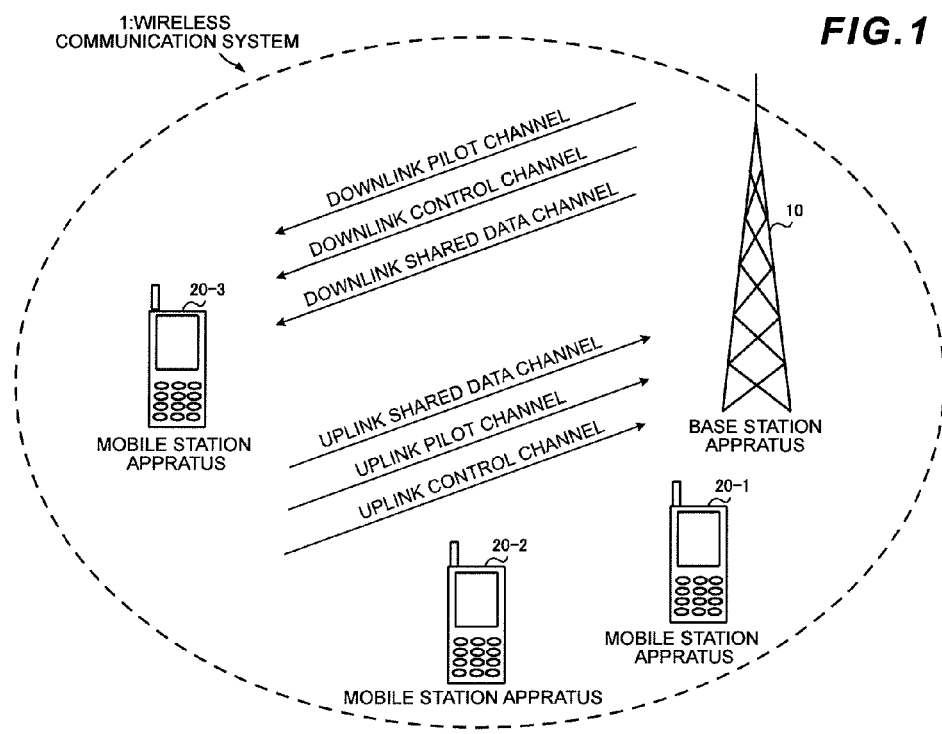
FIG. 1 is a diagram schematically illustrating the entire image of a wireless communication system according to an embodiment of the present invention.

As the third generation (3G) wireless access system of cellular mobile communication, a W-CDMA (wideband code division multiple access) system is standardized in a 3GPP (3rd generation partnership project), and the cellular mobile communication service using this system has been started. In the 3GPP, the evolution of the 3G (EUTRA) and the evolution of the 3G network (evolved universal terrestrial radio access network) have been examined.

In the downlink of the EUTRA, which is a communication direction from a base station apparatus to a mobile station apparatus, an OFDM system that is multicarrier transmission is applied. Moreover, in the uplink of the EUTRA, which is a communication direction from the mobile station apparatus to the base station apparatus, a DFT-spread OFDM system that is single-carrier transmission is applied.

<UL TPC (Uplink Transmit Power Control)>

In the EUTRA, transmission power control is applied in the uplink. In the transmission power control in the uplink of the EUTRA, the average transmission power of an SC-FDMA symbol is controlled, and both an open loop transmission power control method and a closed loop transmission power control method are used.

The open loop transmission power control method is a method in which the mobile station apparatus controls transmission power according to the strength of a signal that is received by the mobile station apparatus from the base station apparatus. In the EUTRA, transmission power is controlled based on path loss calculated from the reception power of a downlink reference signal received by the mobile station apparatus.

The closed loop transmission power control method is a method in which a transmission power control value is set according to the strength of a signal that is received by the base station apparatus from the mobile station apparatus, the transmission power control value is transmitted to the mobile station apparatus using a downlink control channel and the transmission power is controlled according to the transmission power control value included in the downlink control channel received by the mobile station apparatus. In the EUTRA, there are two methods, one in which, in a plurality of downlink sub-frames, the mobile station apparatus uses the cumulative value of the transmission power control values notified from the base station apparatus to control the transmission power, and the other in which, in one downlink sub-frame, the mobile station apparatus uses the transmission power control value itself notified from the base station apparatus to control the transmission power.

In the EUTRA, the transmission power control value that is transmitted by the base station apparatus to the mobile station apparatus using the downlink control channel indicating the radio resource allocation of an uplink shared data channel is composed of two bits. In the method in which, in the plurality of downlink sub-frames, the mobile station apparatus uses the cumulative value of the transmission power control values notified from the base station apparatus to control the transmission power, the transmission power control value [dB] transmitted from the base station apparatus indicates any of values (−1, 0, 1, 3). In the method in which, in one downlink sub-frame, the mobile station apparatus uses the transmission power control value itself notified from the base station apparatus to control the transmission power, the transmission power control value [dB] transmitted from the base station apparatus indicates any of values (−4, −1, 1, 4).

In the EUTRA, the mobile station apparatus controls the average transmission power of the SC-FDMA symbol according to not only the path loss measured by the mobile station apparatus and a parameter of the transmission power control value notified from the base station apparatus to the mobile station apparatus but also the number of uplink resource block pairs allocated to the uplink shared data channel, a modulation scheme dependence power offset value based on a modulation scheme applied to the uplink shared data channel, a reference transmission power control value notified to the mobile station apparatus using the downlink shared data channel at the time of communication connection or the like and a coefficient that is broad cast-transmitted to the mobile station apparatus within the communication area of the base station apparatus using the downlink shared data channel and by which the path loss that is measured by the mobile station apparatus is multiplied.

The mobile station apparatus compares the transmission power value calculated based on the above parameter with the allowable maximum transmission power value of the average transmission power of the own apparatus, and uses the lower value to set the transmission power.

Embodiments of the present invention will be described in detail below with reference to accompanying drawings.

First Embodiment

[Basic Description]

Basic technology in a downlink configuration and an uplink configuration of the EUTRA will first be described.

[Downlink Channel Configuration]

The schematic configuration of the downlink radio frame in the EUTRA will first be described. The downlink radio frame is the unit of radio resource allocation or the like, and is formed with the downlink resource block pair of a frequency band and a time band having a predetermined width. One downlink resource block pair is formed with two downlink resource blocks contiguous in a time region.

One downlink resource block is formed with 12 downlink subcarriers in a frequency region, and is formed with 7 OFDM symbols in a time region. A frequency bandwidth used in the downlink communication of the base station apparatus is referred to as a downlink system bandwidth. In the time region, there are a downlink slot formed with 7 OFDM symbols, a downlink sub-frame formed with 2 downlink slots and a downlink radio frame formed with 10 downlink sub-frames. A unit formed with one downlink subcarrier and one OFDM symbol is referred to as a downlink resource element. In the downlink radio frame, a plurality of downlink resource blocks is allocated according to the downlink system bandwidth.

In each of the downlink sub-frames, at least a downlink shared data channel used for transmission of information data and a downlink control channel used for transmission of control data are allocated. The downlink reference signals in a downlink pilot channel used for channel estimation of the downlink shared data channel and the downlink control channel are allocated in a distributed manner in a plurality of downlink resource elements. Here, the downlink reference signal is a known signal that is used in the downlink pilot channel.

In the downlink control channel, signals are allocated that are generated from control data such as a mobile station identifier, radio resource allocation information on the downlink shared data channel, radio resource allocation information on the uplink shared data channel, the transmission power control value of the uplink shared data channel, multi-antenna related information, a modulation scheme, a coding rate and a retransmission parameter.

[Uplink Channel Configuration]

The schematic configuration of the uplink radio frame in the EUTRA will then be described. The uplink radio frame is the unit of radio resource allocation or the like, and is formed with the uplink resource block pair of a frequency band and a time band having a predetermined width. One uplink resource block pair is formed with two uplink resource blocks contiguous in the time region.

One uplink resource block is formed with 12 uplink subcarriers in the frequency region, and is formed with 7 SC-FDMA (single carrier-frequency division multiple access) symbols in the time region. A frequency bandwidth used in the uplink communication of the base station apparatus is referred to as an uplink system bandwidth. A plurality of uplink resource blocks is allocated according to the uplink system bandwidth.

In the time region, there are an uplink slot formed with 7 SC-FDMA symbols, an uplink sub-frames formed with 2 uplink slots and an uplink radio frame formed with 10 uplink sub-frames. A unit formed with one uplink subcarrier and one SC-FDMA symbol is referred to as an uplink resource element.

In each of the uplink sub-frames, at least an uplink shared data channel used for transmission of information data and an uplink control channel used for transmission of control data are allocated. The uplink control channel transmits control data that includes the channel quality indicator (CQI) for the downlink, reception response ACK/NACK (acknowledgement/negative-acknowledgement) for the downlink shared data channel or scheduling request SR.

In the uplink control channel, different types of uplink control channels are used depending on a case where the uplink control channel is used for transmission of the control data including the channel quality indicator CQI, a case where the uplink control channel is used for transmission of the control data including the reception response ACK/NACK and a case where the uplink control channel is used for transmission of the control data including the scheduling request SR. The different types of uplink control channels have different signal structures.

The uplink resource block pair used for the uplink control channel is symmetrical in the frequency region, and is formed with two uplink resource blocks located in different uplink slots. In one of the uplink resource blocks, the signals of the different uplink control channels are code-multiplexed.

In the uplink pilot channel used for the channel estimation of the uplink shared data channel and the uplink control channel, depending on a case where the uplink pilot channel is allocated within the same uplink resource block as the uplink shared data channel and a case where it is allocated within the same uplink resource block as the uplink control channel, an uplink reference signal is allocated in the SC-FDMA symbol of different positions.

Here, the uplink reference signal refers to a known signal that is used in the uplink pilot channel. When the uplink pilot channel is allocated within the same uplink resource block as the uplink shared data channel, the uplink reference signal is allocated in the SC-FDMA symbol in the fourth position within the uplink slot. When the uplink pilot channel is allocated within the same uplink resource block as the uplink control channel used for transmission of the control data including the channel quality indicator CQI, the uplink reference signal is allocated in the SC-FDMA symbol in the second and fourth positions within the uplink slot.

When the uplink pilot channel is allocated within the same uplink resource block as the uplink control channel used for transmission of the control data including the reception response ACK/NACK, the uplink reference signal is allocated in the SC-FDMA symbol in the third, fourth and fifth positions within the uplink slot. When the uplink pilot channel is allocated within the same uplink resource block as the uplink control channel used for transmission of the control data including the scheduling request SR, the uplink reference signal is allocated in the SC-FDMA symbol in the third, fourth and fifth positions within the uplink slot.

[Description of Wireless Communication System]

The entire image of the wireless communication system according to the present embodiment and the configuration of the radio frame will now be described with reference to FIGS. 1, 2 and 3. The configuration of the wireless communication system according to the present embodiment will then be described with reference to FIGS. 4 to 9. The operation processing of the wireless communication system according to the present embodiment will then be described with reference to FIGS. 10 to 12C.

[The Entire Image of the Wireless Communication System]

FIG. 1 is a diagram schematically illustrating the entire image of the wireless communication system according to the embodiment of the present invention. In the wireless communication system 1 shown in this figure, a base station apparatus 10 and a plurality of mobile station apparatuses 20-1, 20-2 and 20-3 perform wireless communication. This figure shows that a downlink which is a communication direction from the base station apparatus 10 to the mobile station apparatuses 20-1, 20-2 and 20-3 includes a downlink pilot channel, a downlink control channel and a downlink shared data channel.

This figure also shows that an uplink which is a communication direction from the mobile station apparatuses 20-1, 20-2 and 20-3 to the base station apparatus 10 includes an uplink shared data channel, an uplink pilot channel and an uplink control channel. In the following description, one of the mobile station apparatuses 20-1, 20-2 and 20-3 is referred to as a "mobile station apparatus 20."

[Configuration of a Downlink Radio Frame]

Figure 2:
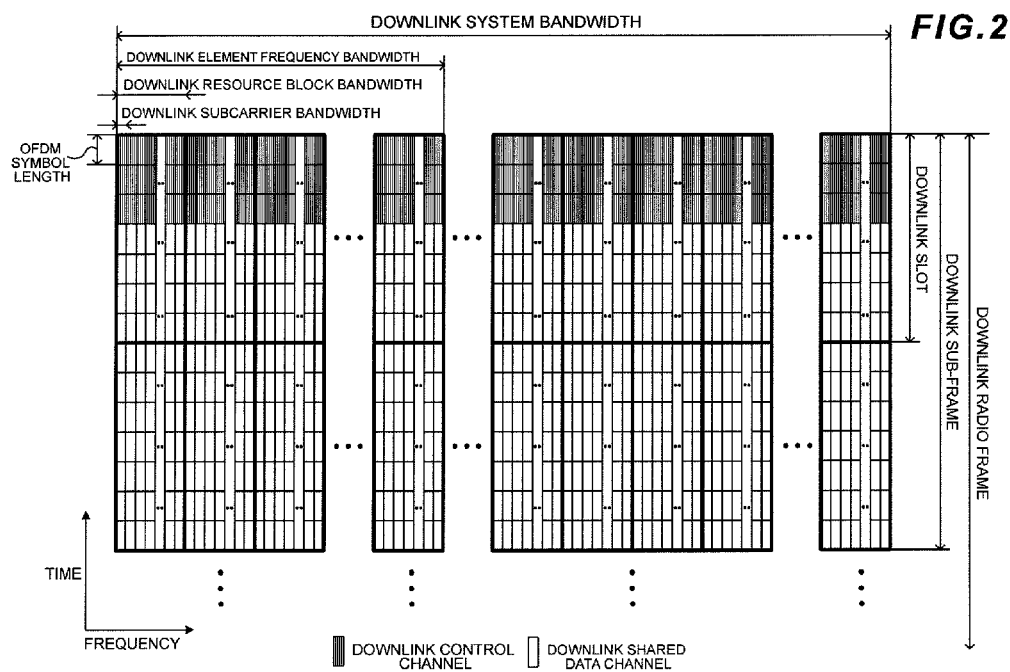
FIG. 2 is a diagram showing the schematic configuration of a downlink radio frame from a base station apparatus 10 to a mobile station apparatus 20 according to the embodiment.

FIG. 2 is a diagram showing the schematic configuration of a downlink radio frame from the base station apparatus 10 to the mobile station apparatus 20 according to the present embodiment. In this figure, the horizontal axis represents a frequency region, and the vertical axis represents a time region. The downlink radio frame is the unit of radio resource allocation or the like, and includes the downlink resource block pair of a frequency band and a time band having a predetermined width. One downlink resource block pair is formed with two downlink resource blocks contiguous in the time region.

In this figure, one downlink resource block is formed with 12 downlink subcarriers in the frequency region, and is formed with 7 OFDM symbols in the time region. A downlink system bandwidth is a frequency bandwidth that is used for the downlink communication of the base station apparatus 10, and is formed with a plurality of downlink element frequency bandwidths. In the wireless communication system 1, the downlink element frequency band is a frequency band of a predetermined frequency bandwidth. For example, the downlink system band of a frequency bandwidth of 60 MHz is formed with three downlink element frequency bands of a frequency bandwidth of 20 MHz.

In the downlink element frequency band, a plurality of downlink resource blocks is allocated according to the downlink element frequency bandwidth. For example, the downlink element frequency band of a frequency bandwidth of 20 MHz is formed with 100 downlink resource blocks. Here, as an example, the downlink element frequency bandwidth is a frequency bandwidth that can be used for communication by the mobile station apparatus 20 compliant with the EUTRA, and the downlink system bandwidth is a frequency bandwidth that can be used for communication by the mobile station apparatus 20 compliant with the A-EUTRA.

In the time region shown in this figure, there are a downlink slot formed with 7 OFDM symbols, a downlink sub-frames formed with 2 downlink slots and a downlink radio frame formed with 10 downlink sub-frames. A unit formed with one downlink subcarrier and one OFDM symbol is referred to as a downlink resource element.

In each of the downlink sub-frames, at least a downlink shared data channel used for transmission of information data and a downlink control channel used for transmission of control data are allocated. Although not shown in this figure, the downlink reference signals of a downlink pilot channel used for estimation of channel fluctuation of the downlink shared data channel and the downlink control channel are distributedly allocated over a plurality of downlink resource elements. Here, in the wireless communication system 1, the downlink reference signal is a known signal that is used in the downlink pilot channel.

In the downlink control channel, signals are allocated that are generated from control data such as a mobile station identifier, radio resource allocation information on the downlink shared data channel, radio resource allocation information on the uplink shared data channel, the transmission power control value of the uplink shared data channel, multi-antenna related information, a modulation scheme, a coding rate and a retransmission parameter.

[Configuration of an Uplink Radio Frame]

Figure 3:
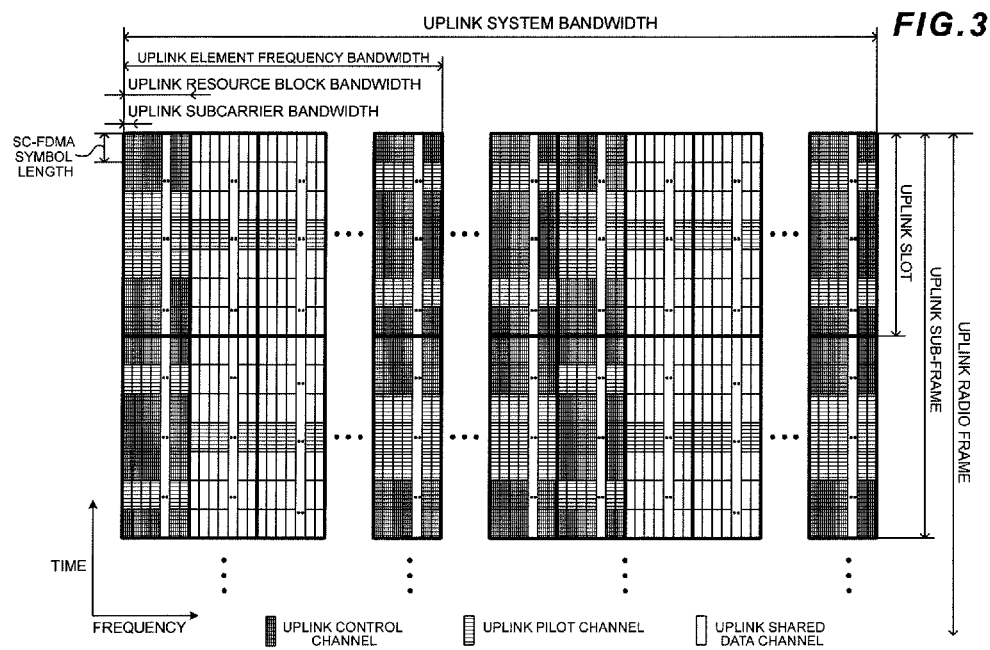
FIG. 3 is a diagram showing the schematic configuration of an uplink radio frame from the base station apparatus 10 to the mobile station apparatus 20 according to the embodiment.

FIG. 3 is a diagram showing the schematic configuration of an uplink radio frame from the mobile station apparatus 20 to the base station apparatus 10 according to the present embodiment. In this figure, the horizontal axis represents a frequency region, and the vertical axis represents a time region. The uplink radio frame is the unit of radio resource allocation or the like, and is formed with the uplink resource block pair of a frequency band and a time band having a predetermined width. One uplink resource block pair is formed with two uplink resource blocks contiguous in the time region.

In this figure, one uplink resource block is formed with 12 uplink subcarriers in the frequency region, and is formed with 7 SC-FDMA symbols in the time region. An uplink system bandwidth is a frequency bandwidth that is used for the uplink communication of the base station apparatus 10, and is formed with a plurality of uplink element frequency bandwidths. In the wireless communication system 1, the uplink element frequency band is a frequency band of a predetermined frequency bandwidth. For example, the uplink system band of a frequency bandwidth of 60 MHz is formed with three uplink element frequency bands of a frequency bandwidth of 20 MHz. In the uplink element frequency band, a plurality of uplink resource blocks is allocated according to the uplink element frequency bandwidth. The uplink element frequency band of a frequency bandwidth of 20 MHz is formed with 100 uplink resource blocks.

Here, the uplink element frequency bandwidth is a frequency bandwidth that can be used for communication by the mobile station apparatus 20 compliant with the EUTRA, and, as an example, the uplink system bandwidth is a frequency bandwidth that can be used for communication by the mobile station apparatus 20 compliant with the A-EUTRA. In the time region shown in this figure, there are an uplink slot formed with 7 SC-FDMA symbols, an uplink sub-frames formed with 2 uplink slots and an uplink radio frame formed with 10 uplink sub-frames. A unit formed with one uplink subcarrier and one SC-FDMA symbol is referred to as an uplink resource element.

In each of the uplink sub-frames, at least an uplink shared data channel used for transmission of information data and an uplink control channel used for transmission of control data are allocated. The uplink control channel is used for transmission of control data that includes the channel quality indicator CQI for the downlink, reception response ACK/NACK for the downlink shared data channel or scheduling request SR.

In the uplink control channel, different types of signal structures are used depending on a case where the uplink control channel is used for transmission of the control data including the channel quality indicator CQI, a case where the uplink control channel is used for transmission of the control data including the reception response ACK/NACK and a case where the uplink control channel is used for transmission of the control data including the scheduling request SR. The uplink resource block pair used for the uplink control channel is symmetrical in the frequency region within the uplink element frequency band, and is formed with two uplink resource blocks located in different uplink slots.

For example, in FIG. 3, in the uplink sub-frame within the uplink element frequency band of the lowest frequency, one uplink resource block pair used in the uplink control channel is formed with the uplink resource block of the lowest frequency in the first uplink slot of the time region and the uplink resource block of the highest frequency in the second uplink slot of the time region In the uplink pilot channel used for the estimation of channel fluctuation of the uplink shared data channel and the uplink control channel, depending on a case where the uplink pilot channel is allocated within the same uplink resource block as the uplink shared data channel and a case where the uplink pilot channel is allocated within the same uplink resource block as the uplink control channel, an uplink reference signal is allocated in the SC-FDMA symbol of different positions in the time region.

Here, the uplink reference signal refers to a known signal, in the wireless communication system 1, that is used in the uplink pilot channel. When the uplink pilot channel is allocated within the same uplink resource block as the uplink shared data channel, the uplink reference signal is allocated in the SC-FDMA symbol in the fourth position within the uplink slot.

When the uplink pilot channel is allocated within the same uplink resource block as the uplink control channel used for transmission of the control data including the channel quality indicator CQI, the uplink reference signal is allocated in the SC-FDMA symbol in the second and sixth positions within the uplink slot. When the uplink pilot channel is allocated within the same uplink resource block as the uplink control channel used for transmission of the control data including the reception response ACK/NACK, the uplink reference signal is allocated in the SC-FDMA symbol in the third, fourth and fifth positions within the uplink slot.

When the uplink pilot channel is allocated within the same uplink resource block as the uplink control channel used for transmission of the control data including the scheduling request SR, the uplink reference signal is allocated in the SC-FDMA symbol in the third, fourth and fifth positions within the uplink slot.

Although this figure shows a case where the uplink control channel is allocated in the endmost uplink resource block in the frequency region of each of the uplink element frequency band, for example, the second and third uplink resource blocks from the end of the uplink element frequency band may be used in the uplink control channel.

In the wireless communication system according to the embodiment of the present invention, the OFDM system is applied in the downlink, and N×DFT-spread OFDM system is applied in the uplink. Here, the N×DFT-spread OFDM system is a system of receiving and transmitting signals in each of the uplink element frequency bands using the DFT-spread OFDM system; it is a system of performing communication using a plurality of processing sections related to the DFT-spread OFDM reception and transmission in the uplink subframe of the wires communication system using a plurality of uplink element frequency bands.

[Overall Configuration of the Base Station Apparatus]

Figure 4:
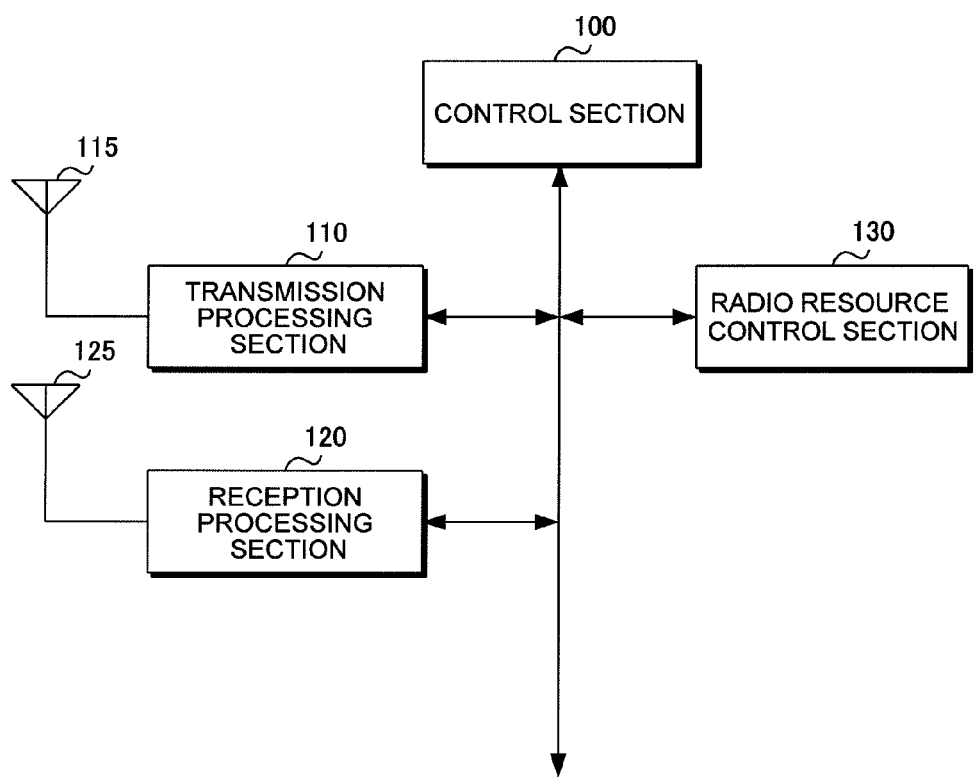
FIG. 4 is a schematic block diagram showing the configuration of the base station apparatus 10 according to the embodiment.
Figure 5:
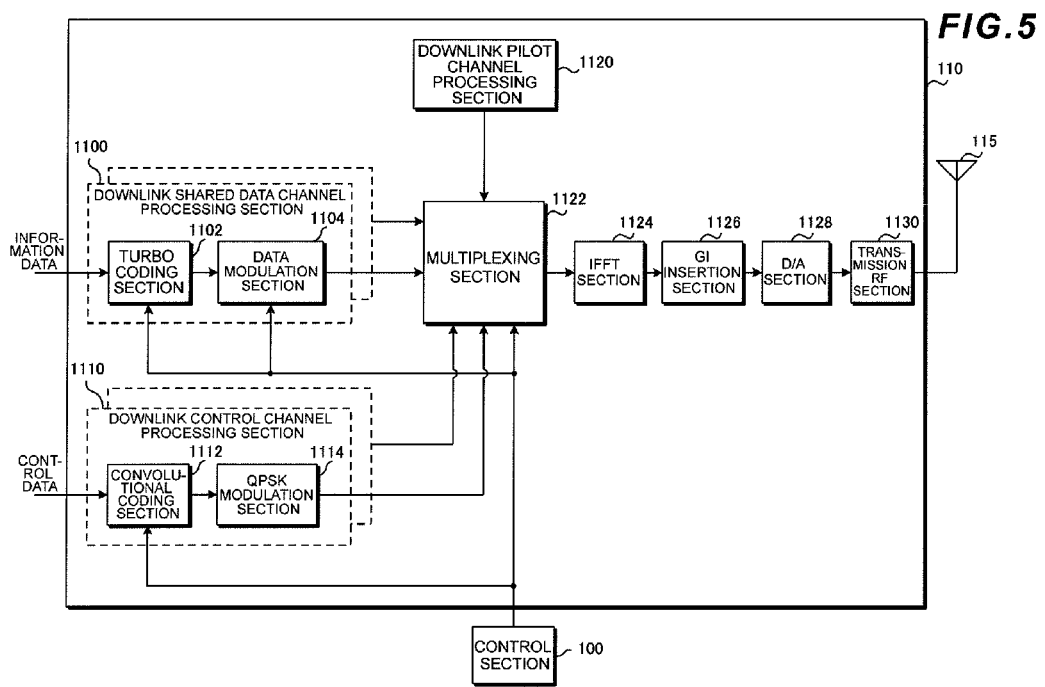
FIG. 5 is a schematic block diagram showing the configuration of a transmission processing section 110 of the base station apparatus 10 according to the embodiment.
Figure 6:
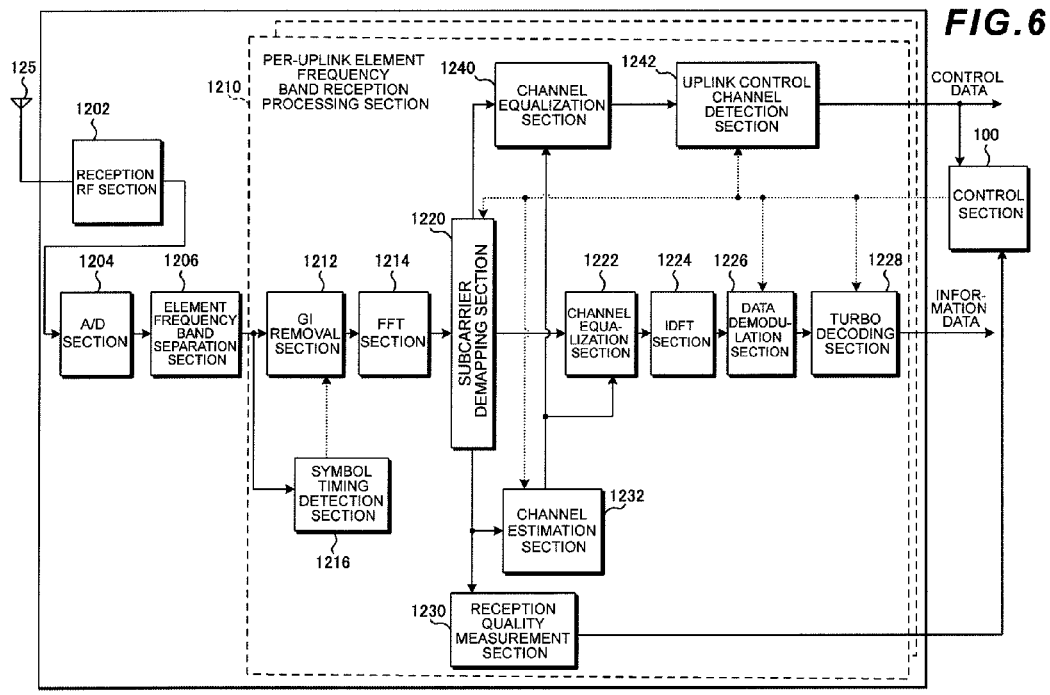
FIG. 6 is a schematic block diagram showing the configuration of a reception processing section 120 of the base station apparatus 10 according to the embodiment.

The configuration of the base station apparatus 10 according to the present embodiment will now be described with reference to FIGS. 4, 5 and 6. FIG. 4 is a schematic block diagram showing the configuration of the base station apparatus 10 according to the present embodiment. As shown in this figure, the base station apparatus 10 includes a control section 100 (base station side control section), a transmission processing section 110, a reception processing section 120 and a radio resource control section 130. A transmission antenna 115 is connected to the transmission processing section 110; a reception antenna 125 is connected to the reception processing section 120.

Based on radio resource control information input from the radio resource control section 130, the control section 100 performs, on the transmission processing section 110, control on the radio resource allocation, the modulation scheme and the coding rate of the downlink shared data channel and the downlink control channel. Based on the radio resource control information, the control section 100 generates control data to be transmitted using the downlink control channel, and outputs it to the transmission processing section 110.

Based on the radio resource control information input from the radio resource control section 130, the control section 100 performs, on the reception processing section 120, control on the radio resource allocation, the transmission power, the modulation scheme and the coding rate of the uplink shared data channel and the uplink control channel. The control section 100 outputs, to the radio resource control section 130, uplink channel quality input from the reception processing section 120. Based on the radio resource control information input from the radio resource control section 130, the control section 100 generates control data to be transmitted using the downlink control channel, and outputs it to the transmission processing section 110.

The control section 100 selects any one of the first transmission mode of transmitting a signal in each of the uplink element frequency bands to the mobile station apparatus 20 allocating the radio resource of the uplink shared data channel to a plurality of uplink element frequency bands using a common transmission antenna and the second transmission mode of transmitting a signal in each element frequency band using a different transmission antenna, and outputs information on the selected transmission mode to the transmission processing section 110. The control section 100 selects the transmission mode based on information as to the remaining transmission power of each of a plurality of power amplifiers notified by the mobile station apparatus 20 and the average transmission power in a plurality of uplink element frequency bands set in the mobile station apparatus 20.

Based on the control signal input from the control section 100, the transmission processing section 110 generates a signal to be transmitted using the downlink shared data channel, and transmits it through the transmission antenna 115. The transmission processing section 110 transmits information data input from an upper layer and information on the transmission mode input from the control section 100 using the downlink shared data channel, and transmits the control data input from the control section 100 using the downlink control channel.

According to an instruction from the control section 100, the reception processing section 120 detects, demodulates and decodes the reception signals of the uplink control channel and the uplink shared data channel received from the mobile station apparatus 20 through the reception antenna 125, and extracts control data and information data. The reception processing section 120 outputs the extracted control data to the control section 100, and outputs the information data to the upper layer. The reception processing section 120 also outputs, to the control section 100, control information included in the information data extracted from the uplink shared data channel. For example, the reception processing section 120 outputs, to the control section 100, information as to the remaining transmission power (referred to as power headroom) of each of a plurality of power amplifiers notified by the mobile station apparatus.

Based on the received uplink reference signal, the reception processing section 120 measures the channel quality (hereinafter referred to as uplink channel quality) of the uplink of the mobile station apparatus 20, and outputs the measured uplink channel quality to the radio resource control section 130 through the control section 100. The details of the reception processing section 120 will be described later.

The radio resource control section 130 sets the transmission power of each of the mobile station apparatuses 20, an intermittent transmission and reception cycle, the radio resource allocation of the downlink control channel, the radio resource allocation of the uplink control channel, the radio resource allocation of the uplink shared data channel, the modulation scheme and the coding rate of each type of channel, the transmission power control value in each of the uplink element frequency bands and the like, and outputs the radio resource control information to the control section 100. Part of the radio resource control information is transmitted to the mobile station apparatus 20 based on an instruction from the control section 100 through the transmission processing section 110.

The radio resource control section 130 sets the transmission power control value based on the uplink channel quality input from the reception processing section 120 through the control section 100. If the uplink channel quality is lower than required quality, the radio resource control section 130 sets the transmission power control value to be indicated such that the transmission power is increased; if the uplink channel quality is higher than the required quality, the radio resource control section 130 sets the transmission power control value to be indicated such that the transmission power is decreased; if the uplink channel quality is substantially equal to the required quality, the radio resource control section 130 sets the transmission power control value to be indicated such that the transmission power is maintained.

[Configuration of the Transmission Processing Section of the Base Station Apparatus]

The details of the transmission processing section 110 of the base station apparatus 10 will be described below. FIG. 5 is a schematic block diagram showing the configuration of the transmission processing section 110 of the base station apparatus 10 according to the present embodiment.

As shown in this figure, the transmission processing section includes: a plurality of downlink shared data channel processing sections 1100; a plurality of downlink control channel processing sections 1110; a downlink pilot channel processing section 1120; a multiplexing section 1122; an IFFT (inverse fast Fourier transform) section 1124; a GI (guard interval) insertion section 1126; a D/A (digital/analog) section 1128; and a transmission RF (radio frequency) section 1130 (base station side transmission section). The transmission antenna 115 is connected to the transmission RF section 1130.

The downlink shared data channel processing sections 1100 and the downlink control channel processing sections 1110 have the same configuration and function, and therefore a typical one of them will be described.

As shown in this figure, each of the downlink control channel processing sections 1110 includes a turbo coding section 1102 and a data modulation section 1104; each of the downlink control channel processing sections 1110 includes a convolutional coding section 1112 and a QPSK modulation section 1114.

The downlink shared data channel processing section 1100 is a processing section that performs base band signal processing for transmitting information data to the mobile station apparatus 20 with the OFDM method. The turbo coding section 1102 performs turbo coding for increasing the resistance to data error on the input information data at the coding rate input from the control section, and outputs it to the data modulation section 1104.

The data modulation section 1104 modulates the code data coded by the turbo coding section 1102 with the modulation scheme input from the control section 100 such as QPSK (quadrature phase shift keying), 16QAM (16 quadrature amplitude modulation) or 64QAM (64 quadrature amplitude modulation), and generates the signal sequence of a modulation symbol. The data modulation section outputs the generated signal sequence to the multiplexing section 1122.

The downlink control channel processing sections 1110 is a processing section that performs base band signal processing for transmitting the control data input from the control section with the OFDM method. The convolutional coding section 1112 performs convolution coding for increasing the resistance to the error of the control data based on the coding rate input from the control section 100. Here, the control data is controlled based on a bit unit. Based on the coding rate input from the control section 100, the convolutional coding section 1112 also performs rate matching on the bit on which convolution coding processing has been performed so that the number of output bits is adjusted. Then, the convolutional coding section 1112 outputs the coded control data to the QPSK modulation section 1114.

The QPSK modulation section 1114 modulates the control data coded by the convolutional coding section 1112 with the QPSK modulation scheme, and outputs the modulated signal sequence of the modulation symbol to the multiplexing section 1122. The downlink pilot channel processing section 1120 generates the downlink reference signal that is a known signal in the mobile station apparatus 20, and outputs it to the multiplexing section 1122. The multiplexing section 1122 multiplexes a signal input from the downlink pilot channel processing section 1120, a signal input from each of the downlink shared data channel processing sections 1100 and a signal input from each of the downlink control channel processing sections 1110 according to an instruction from the control section 100 onto the downlink radio frame.

The radio resource information as to the radio resource allocation of the downlink shared data channel set by the radio resource control section 130 and the radio resource allocation of the downlink control channel is input to the control section 100; based on the radio resource control information, the control section 100 control processing on the multiplexing section 1122.

The multiplexing section 1122 multiplexes the downlink shared data channel and the downlink control channel with time multiplexing as shown in FIG. 2. The multiplexing section 1122 multiplexes the downlink pilot channel and other channels with time/frequency multiplexing.

The multiplexing section 1122 multiplexes the downlink shared data channels to the mobile station apparatuses 20 for each of the downlink resource blocks; the multiplexing section 1122 may multiplex the downlink shared data channels using a plurality of downlink resource blocks for one mobile station apparatus 20. The multiplexing section 1122 also multiplexes the downlink control channels to the mobile station apparatuses 20 using a plurality of downlink resource elements distributed separately within the same downlink element frequency band. Furthermore, the multiplexing section 1122 outputs the multiplexed signal to the IFFT section 1124.

The IFFT section 1124 performs inverse fast Fourier transform on the signal multiplexed by the multiplexing section 1122, modulates it with the OFDM method and outputs it to the GI insertion section 1126. The GI insertion section 1126 adds a guard interval to the signal modulated with the OFDM method, and thereby generates a digital signal of a baseband including a symbol in the OFDM method. As is known, the guard interval is generated by copying part of the front or the end of a symbol to be transmitted. Furthermore, the GI insertion section 1126 outputs the generated digital signal of the baseband to the D/A section 1128.

The D/A section 1128 converts the digital signal of the baseband input from the GI insertion section 1126 into an analog signal, and outputs it to the transmission RF section 1130. The transmission RF section 1130 generates the in-phase component and the orthogonal component of an intermediate frequency from the analog signal input from the D/A section 1128, and removes an excess frequency component in an intermediate frequency band. Then, the transmission RF section 1130 converts (up-converts) the signal of the intermediate frequency into the signal of a high frequency to remove the excess frequency component, power-amplifies the signal with a power amplifier and transmits it to the mobile station apparatus 20 through the transmission antenna 115.

[Configuration of the Reception Processing Section of the Base Station Apparatus]

The details of the reception processing section 120 of the base station apparatus 10 will be described below. FIG. 6 is a schematic block diagram showing the configuration of the reception processing section 120 of the base station apparatus 10 according to the present embodiment. As shown in this figure, the reception processing section includes a reception RF section 1202, an A/D (analog/digital; analog/digital conversion) section 1204, an element frequency band separation section 1206 and a plurality of per-uplink element frequency band reception processing sections 1210.

As shown in this figure, the per-uplink element frequency band reception processing section 1210 includes a GI removal section 1212, a symbol timing detection section 1216, an FFT section 1214, a subcarrier demapping section 1220, a reception quality measurement section 1230, a channel estimation section 1232, a channel equalization section for an uplink shared data channel 1240, a channel equalization section for an uplink control channel 1222, an IDFT section 1224, a data demodulation section 1226, a turbo decoding section 1228 and an uplink control channel detection section 1242. The per-uplink element frequency band reception processing sections 1210 have the same configuration and function, and therefore a typical one of them will be described.

The reception RF section 1202 appropriately amplifies the signal received by the reception antenna 125, converts (down-converts) it into an intermediate frequency, removes an unnecessary frequency component, controls an amplification level so as to appropriately maintain the signal level and performs orthogonal demodulation based on the in-phase component and the orthogonal component of the received signal. The reception RF section 1202 outputs the orthogonally demodulated analog signal to the A/D section 1204.

The A/D section 1204 converts the analog signal orthogonally demodulated by the reception RF section 1202 into a digital signal, and outputs the converted digital signal to the element frequency band separation section 1206. The element frequency band separation section 1206 separates the received signal in each of the uplink element frequency bands of the uplink system bandwidth, and outputs them to the per-uplink element frequency band reception processing section 1210. The per-uplink element frequency band reception processing section 1210 demodulates and decodes the uplink shared data channel within the uplink element frequency band and the uplink control channel, detects the information data and the control data and outputs them.

Here, the symbol timing detection section 1216 detects, based on the signal input from the element frequency band separation section 1206, the timing of the symbol, and outputs the control signal indicating the timing of the detected symbol boundary to the GI removal section 1212.

Based on the control signal from the symbol timing detection section 1216, the GI removal section 1212 removes a portion corresponding to a guard interval from the signal input from the element frequency band separation section 1206, and outputs the remaining portions of the signal to the FFT section 1214. The FFT section 1214 performs fast Fourier transform on the signal input from the GI removal section 1212, demodulates it with DFT-spread-OFDM method and outputs it to the subcarrier demapping section. The number of points of the FFT section 1214 is equal to the number of points of the IFFT section of the mobile station apparatus 20, which will be described later.

Based on the control signal input from the control section 100, the subcarrier demapping section 1220 separates the signal demodulated by the FFT section 1214 into the uplink pilot channel signal, the uplink shared data channel signal and the uplink control channel signal. The subcarrier demapping section 1220 outputs the separated uplink pilot channel signal to the channel estimation section 1232 and the reception quality measurement section 1230, outputs the separated uplink shared data channel signal to the channel equalization section for the uplink control channel 1222 and outputs the separated uplink control channel signal to the channel equalization section for the uplink shared data channel 1240.

The channel estimation section 1232 estimates the fluctuation of the channel using the uplink reference signal of the uplink pilot channel separated by the subcarrier demapping section 1220 and a known signal. The channel estimation section 1232 outputs the estimated channel estimation value to the channel equalization section for the uplink control channel 1222 and the channel equalization section for the uplink shared data channel 1240. The reception quality measurement section 1230 measures, in each of the uplink element frequency bands, reception quality using the uplink reference signal of the uplink pilot channel, and outputs, to the control section 100, the uplink channel quality that is the measurement result of the reception quality of each of the uplink element frequency bands.

The channel equalization section for the uplink control channel 1222 equalizes, based on the channel estimation value input from the channel estimation section 1232, the amplitude and the phase of the uplink shared data channel signal separated by the subcarrier demapping section 1220. Here, the equalization refers to processing for returning to the original state the channel fluctuated while the signal is wirelessly communicated. The channel equalization section for the uplink control channel 1222 outputs the equalized signal to the IDFT section 1224.

The IDFT section 1224 performs inverse discrete Fourier transform on the signal input from the channel equalization section for the uplink control channel 1222, and outputs it to the data demodulation section 1226. The data demodulation section 1226 demodulates the uplink shared data channel signal transformed by the IDFT section 1224, and outputs the demodulated uplink shared data channel signal to the turbo decoding section 1228. This demodulation is demodulation that corresponds to the modulation scheme used in the data modulation section of the mobile station apparatus 20, and the demodulation scheme is input from the control section 100.

The turbo decoding section 1228 decodes the information data from the uplink shared data channel signal input and demodulated from the data demodulation section 1226. The coding rate is input from the control section 100. The channel equalization section for the uplink shared data channel 1240 equalizes, based on the channel estimation value input from the channel estimation section 1232, the amplitude and the phase of the uplink control channel signal separated by the subcarrier demapping section 1220. The channel equalization section for the uplink shared data channel 1240 outputs the equalized signal to the uplink control channel detection section 1242.

The uplink control channel detection section 1242 detects, demodulates and decodes the signal input from the channel equalization section for the uplink shared data channel 1240 according to the type of transmitted control data, and detects the control data. Here, the base station apparatus 10 previously grasps the type of control data transmitted by the mobile station apparatus 20. The uplink control channel detection section 1242 outputs the detected control data to the control section 100. Based on the control data transmitted to the mobile station apparatus 20 using the downlink control channel and the radio resource control information previously notified using the downlink shared data channel, the control section 100 performs control on the subcarrier demapping section 1220, the data demodulation section 1226, the turbo decoding section 1228, the channel estimation section 1232 and the uplink control channel detection section 1242.

Based on the control data transmitted to the mobile station apparatus 20 and the radio resource control information, the control section 100 grasps in which one of the radio resources of the uplink element frequency band the uplink shared data channel transmitted by the mobile station apparatus 20 and the uplink control channel are allocated.

[Overall Configuration of the Mobile Station Apparatus]

Figure 7:
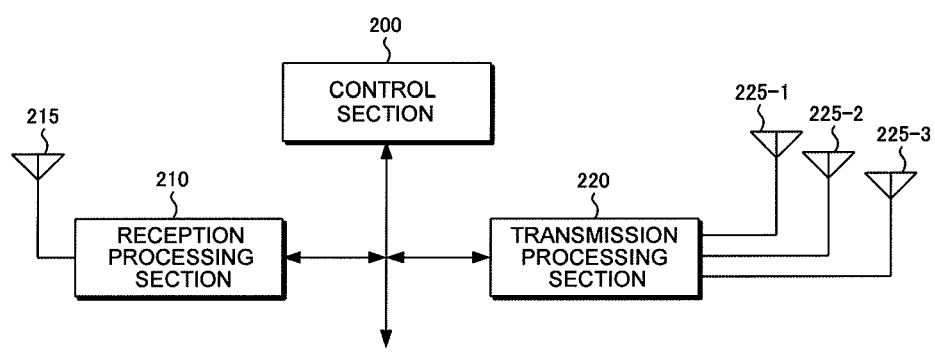
FIG. 7 is a schematic block diagram showing the configuration of the mobile station apparatus 20 according to the embodiment.
Figure 8:
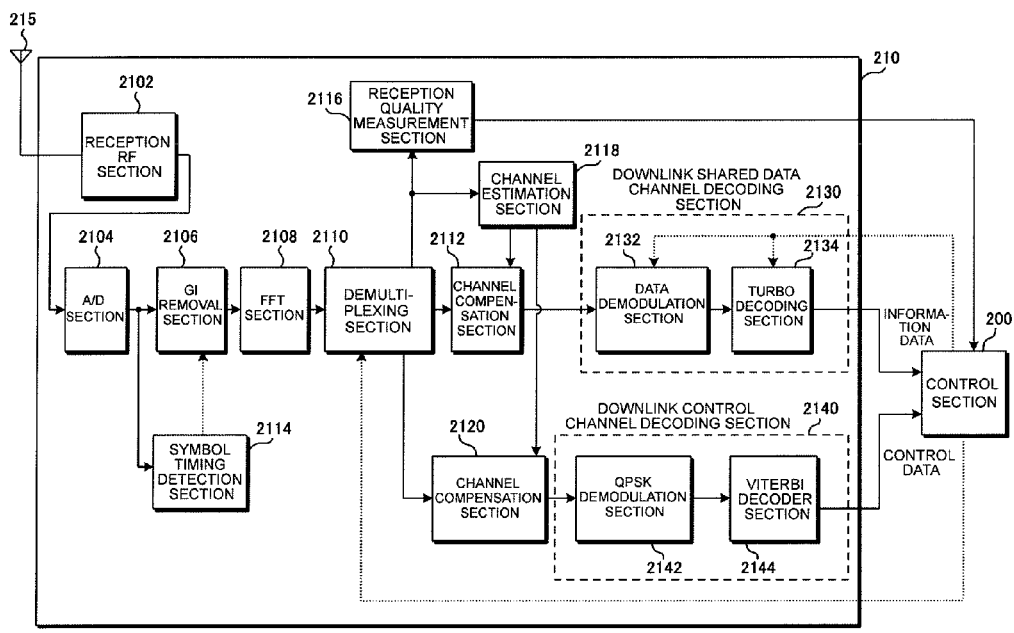
FIG. 8 is a schematic block diagram showing the configuration of a reception processing section 210 of the mobile station apparatus 20 according to the embodiment.

The configuration of the mobile station apparatus 20 according to the present embodiment will be described below with reference to FIGS. 7, 8 and 9. FIG. 7 is a schematic block diagram showing the configuration of the mobile station apparatus 20 according to the present embodiment. As shown in this figure, the mobile station apparatus 20 includes a control section 200, a reception processing section 210 and a transmission processing section 220. Transmission antennas 225-1, 225-2 and 225-3 are connected to the transmission processing section 220; a reception antenna 215 is connected to the reception processing section 210.

The control section 200 checks the data that is transmitted using the downlink shared data channel and that is input from the reception processing section 210, outputs information data among the data to the upper layer and controls the reception processing section 210 and the transmission processing section 220 based on the radio resource control information among the data. For example, the control section 200 controls processing on the uplink control channel of the transmission processing section 220 based on information on the radio resource and a radio resource allocation period in each of the uplink element frequency bands of the uplink control channel included in the radio resource control information.

The control section 200 controls the reception processing section 210 and the transmission processing section 220 based on the control data. When the reception processing section 210 detects the downlink control channel signal indicating the radio resource allocation of the uplink shared data channel, the control section 200 receives, from the reception processing section 210, the control data indicating the radio resource allocation of the uplink shared data channel in one or a plurality of uplink element frequency bands and the control data indicating the transmission power control value of the uplink shared data channel.

The control section 200 also sets the upper limit value of the average transmission power on the transmission processing section 220. Based on the information on the transmission mode transmitted using the downlink shared data channel, the control section 200 selects any one of the first transmission mode in which signals in the uplink element frequency bands are transmitted using a common transmission antenna and the second transmission mode in which signals in the uplink element frequency bands are transmitted using different transmission antennas, and controls the transmission processing section 220. Specifically, the control section 200 controls the output of the signals in the uplink element frequency bands to the transmission antennas 225-1, 225-2 and 225-3 by the transmission processing section 220.

The control section 200 also generates the information on the channel quality indicator CQI and the reception power of the downlink reference signal based on the reception quality (hereinafter referred to as downlink channel quality) input from the reception processing section 210, and controls the transmission processing section 220 such that the channel quality indicator CQI is transmitted using the uplink control channel and the information on the reception power of the downlink reference signal using the uplink shared data channel.

The control section 200 measures the remaining transmission power of a plurality of power amplifiers, generates information on the remaining transmission power for each of the power amplifiers and controls the transmission processing section 220 such that the information is transmitted to the base station apparatus 10 using the uplink shared data channel. The remaining transmission power refers to a value obtained by subtracting the average transmission power being currently used for the transmission from the upper limit value of the power that can be handled by the power amplifier, and means the remaining transmission power that can be further used for the transmission. For example, the remaining transmission power is indicated by the information of the unit of 1 dB within [40; ~23 dB]. The control section 200 grasps the remaining transmission power for each of a plurality of power amplifiers, and controls the transmission processing section 220 such that information on the remaining transmission power is transmitted to the base station apparatus 10.

The reception processing section 210 receives a signal from the base station apparatus 10 through the reception antenna 215, and demodulates and decodes the reception signal according to an instruction from the control section 200. If the reception processing section 210 detects the downlink control channel signal transmitted thereto, the reception processing section 210 outputs, to the control section 200, the control data acquired by decoding the downlink control channel signal. If the reception processing section 210 detects the downlink control channel signal indicating the radio resource allocation of the uplink shared data channel, the control data includes information such as the transmission power control value of the uplink shared data channel.

Based on an instruction from the control section 200 after the control data included in the downlink control channel is output to the control section, the reception processing section 210 outputs, to the upper layer through the control section 200, the information data obtained by decoding the downlink shared data channel transmitted thereto. The reception processing section 210 also outputs, to the control section 200, the radio resource control information obtained by decoding the downlink shared data channel and information on the transmission mode. The reception processing section also uses the downlink reference signal of the downlink pilot channel in each of the downlink element frequency bands to measure the reception quality, and outputs the result of the measurement to the control section 200. The details of the reception processing section 210 will be described later.

The transmission processing section 220 encodes, according to an instruction from the control section 200, the information data and the control data, sets the transmission power value of the modulated signal and transmits the signal in each of the uplink element frequency bands to the base station apparatus 10 through one or more transmission antennas. For example, the transmission processing section 220 transmits a signal including information on remaining transmission power for each of a plurality of power amplifiers. If the control section 200 selects the first transmission mode, the transmission processing section 220 outputs the signal in each of the uplink element frequency bands to a common transmission antenna through a common power amplifier whereas, if the control section 200 selects the second transmission mode, the transmission processing section 220 outputs the signal in each of the uplink element frequency bands to a different transmission antenna through a different power amplifier. The details of the transmission processing section 220 will be described later.

[Configuration of the Reception Processing Section of the Mobile Station Apparatus]

The details of the reception processing section 210 of the mobile station apparatus 20 will be described below. FIG. 8 is a schematic block diagram showing the configuration of the reception processing section 210 of the mobile station apparatus 20 according to the present embodiment. As shown in this figure, the reception antenna 215 is connected to the reception processing section 210, and the reception processing section 210 includes a reception RF section 2102, an A/D section 2104, a symbol timing detection section 2114, a GI removal section 2106, an FFT section 2108, a demultiplexing section 2110, a channel estimation section 2118, a reception quality measurement section 2116, a channel compensation section for the downlink shared data channel 2112, a downlink shared data channel decoding section 2130, a channel compensation section for the downlink control channel 2120 and a downlink control channel decoding section 2140.

As shown in this figure, the downlink shared data channel decoding section 2130 includes a data demodulation section 2132 and a turbo decoding section 2134, and the downlink control channel decoding section 2140 includes a QPSK demodulation section 2142 and a Viterbi decoder section 2144. The reception RF section 2102 appropriately amplifies the signal received by the reception antenna 215, converts (down-converts) it into an intermediate frequency, removes an unnecessary frequency component, controls an amplification level so as to appropriately maintain the signal level and performs orthogonal demodulation based on the in-phase component and the orthogonal component of the received signal. The reception RF section 2102 outputs the orthogonally demodulated analog signal to the A/D section 2104.

The A/D section 2104 converts the analog signal orthogonally demodulated by the reception RF section 2102 into a digital signal, and outputs the converted digital signal to the symbol timing detection section 2114 and the GI removal section 2106. The symbol timing detection section 2114 detects, based on the digital signal converted by the A/D section 2104, the timing of the OFDM symbol, and outputs a control signal indicating the timing of the detected symbol boundary to the GI removal section 2106.

Based on the control signal from the symbol timing detection section 2114, the GI removal section 2106 removes a portion corresponding to a guard interval from the digital signal output from the A/D section 2104, and outputs the remaining portions of the signal to the FFT section 2108. The FFT section 2108 performs fast Fourier transform on the signal input from the GI removal section 2106, demodulates it with the OFDM method and outputs it to the demultiplexing section 2110.

Based on the control signal input from the control section 200, the demultiplexing section 2110 separates the signal demodulated by the FFT section 2108 into the downlink control channel signal and the downlink shared data channel signal. The demultiplexing section 2110 outputs the separated downlink shared data channel signal to the channel compensation section for the downlink shared data channel 2112 and also outputs the separated downlink control channel signal to the channel compensation section for the downlink control channel 2120.

The demultiplexing section 2110 also separates the downlink resource element where the downlink pilot channel is allocated, and outputs the downlink reference signal in the downlink pilot channel to the channel estimation section 2118 and the reception quality measurement section 2116. The channel estimation section 2118 uses the downlink reference signal in the downlink pilot channel separated by the demultiplexing section 2110 and a known signal to estimate the fluctuation of the channel, and outputs a channel compensation value for adjusting the amplitude and the phase to the channel compensation section for the downlink shared data channel 2112 and the channel compensation section for the downlink control channel 2120 so as to compensate for the fluctuation of the channel.

The reception quality measurement section 2116 uses the downlink reference signal in the downlink pilot channel to measure the downlink channel quality, and outputs the result of the measurement to the control section 200. For each of the subcarriers, the channel compensation section for the downlink shared data channel 2112 adjusts, according to the channel compensation value input from the channel estimation section 2118, the amplitude and the phase of the signal in the downlink shared data channel separated by the demultiplexing section. The channel compensation section for the downlink shared data channel 2112 outputs the signal having the channel adjusted to the data demodulation section 2132 of the downlink shared data channel decoding section 2130.

The downlink shared data channel decoding section 2130 is a processing section that demodulates and decodes the downlink shared data channel based on an instruction from the control section 200, and that detects the information data. The data demodulation section 2132 demodulates the downlink shared data channel signal input from the channel compensation section 2112, and outputs the demodulated downlink shared data channel signal to the turbo decoding section. This demodulation is demodulation that corresponds to the modulation scheme used in the data modulation section of the base station apparatus 10.

The turbo decoding section 2134 decodes the information data from the downlink shared data channel signal input and demodulated from the data demodulation section 2132, and outputs it to the upper layer through the control section 200. The radio resource control information and the information on the transmission mode transmitted using the downlink shared data channel are also output to the control section 200. The channel compensation section for the downlink control channel 2120 adjusts the amplitude and the phase of the downlink control channel signal separated by the demultiplexing section 2110 according to the channel compensation value input from the channel estimation section 2118. The channel compensation section for the downlink control channel 2120 outputs the adjusted signal to the QPSK demodulation section 2142 of the downlink control channel decoding section 2140.

The downlink control channel decoding section 2140 is a processing section that demodulates and decodes, as described below, the signal input from the channel compensation section 2120 and that detects the control data. The QPSK demodulation section 2142 QPSK-demodulates the downlink control channel signal, and outputs it to the Viterbi decoder section 2144.

The Viterbi decoder section 2144 decodes the signal demodulated by the QPSK demodulation section 2142, and outputs the decoded control data to the control section 200. Here, this signal is expressed based on a bit unit, and the Viterbi decoder section 2144 also performs rate dematching for adjusting the number of bits to perform Viterbi decoding processing on the input bit.

The control section 200 determines whether or not the control data input from the Viterbi decoder section 2144 is not erroneous and is control data transmitted thereto; if it is determined that the control data is not erroneous and is control data transmitted thereto, the control section 200 controls, based on the control data, the demultiplexing section, the data demodulation section, the turbo decoding section and the transmission processing section. If the control data is information on the radio resource allocation of the uplink shared data channel, the control section 200 inputs, based on the control data, the information data to the per-uplink element frequency band transmission processing section of the transmission processing section 220, which will be described later, and controls the transmission power.

[Configuration of the Transmission Processing Section of the Mobile Station Apparatus]

Figure 9:
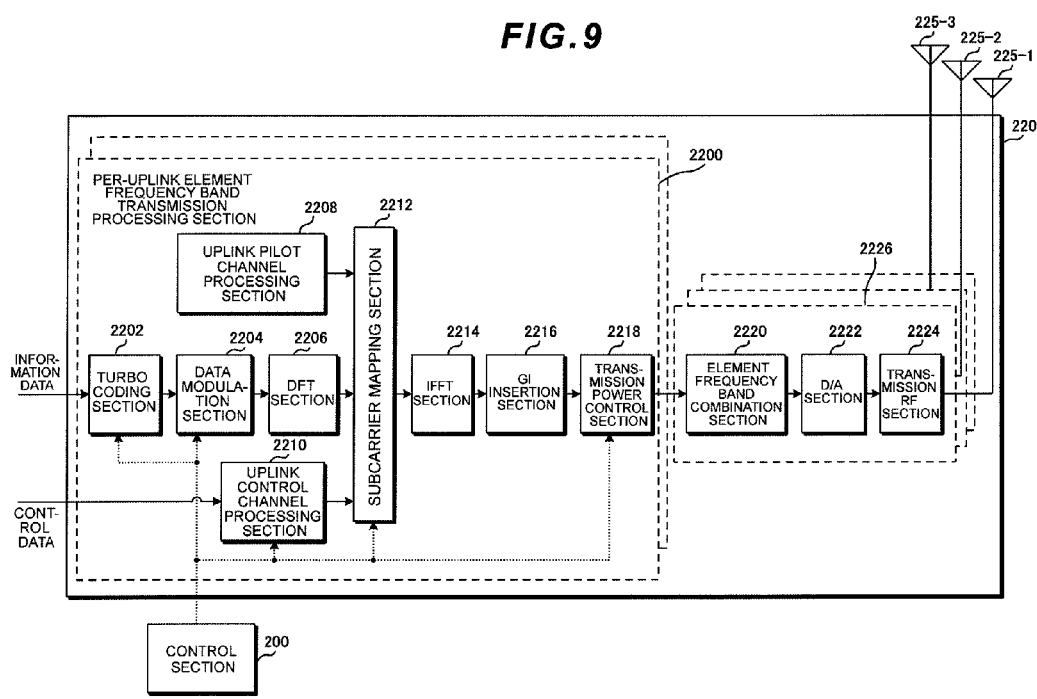
FIG. 9 is a schematic block diagram showing the configuration of a transmission processing section 220 of the mobile station apparatus 20 according to the embodiment.

FIG. 9 is a schematic block diagram showing the configuration of the transmission processing section 220 of the mobile station apparatus 20 according to the present embodiment. As shown in this figure, the transmission processing section 220 includes a plurality of per-uplink element frequency band transmission processing sections 2200 and a plurality of transmission sections 2226; the three transmission antennas 225-1, 225-2 and 225-3 are connected thereto.

As shown in this figure, the per-uplink element frequency band transmission processing sections 2200 includes a turbo coding section 2202, a data modulation section 2204, a DFT section 2206, an uplink pilot channel processing section 2208, an uplink control channel processing section 2210, a subcarrier mapping section 2212, an IFFT section 2214, a GI insertion section 2216 and a transmission power control section 2218. The mobile station apparatus 20 includes the per-uplink element frequency band transmission processing sections 2200 corresponding to the number of uplink element frequency bands that can be handled.

As shown in this figure, the transmission section 2226 includes an element frequency band combination section 2220, a D/A section 2222 and a transmission RF section 2224. The mobile station apparatus 20 includes the transmission sections 2226 corresponding to the number of transmission antennas. Here, a case where the mobile station apparatus 20 is provided with three transmission sections 2226 will be shown.

The per-uplink element frequency band transmission processing sections 2200 and the transmission sections 2226 have the same configuration and function, and therefore a typical one of each of them will be described.

The per-uplink element frequency band transmission processing sections 2200 is a processing section that sets coding, modulation and transmission power on the information data and the control data, and that generates a signal which is transmitted using the uplink shared data channel and the uplink control channel within the uplink element frequency band. The per-uplink element frequency band transmission processing sections 2200 also outputs the generated signal to the transmission section 2226 based on an instruction from the control section 200.

The mobile station apparatus 20 of the present embodiment is not limited to the number of transmission antennas and the number of transmission sections described here. For example, the present embodiment may be configured such that four transmission antennas and four transmission sections are provided.

The turbo coding section 2202 performs turbo coding for increasing the resistance to data error on the input information data at the coding rate indicated by the control section 200, and outputs it to the data modulation section 2204. The data modulation section 2204 modulates the code data coded by the turbo coding section 2202 with a modulation scheme indicated by the control section 200 such as QPSK, 16QAM or 64QAM, and generates the signal sequence of a modulation symbol. The data modulation section 2204 outputs the generated signal sequence of the modulation symbol to the DFT section 2206.

The DFT section 2206 performs discrete Fourier transform on the signal output by the data modulation section 2204, and outputs it to the subcarrier mapping section 2212. The uplink control channel processing section 2210 performs baseband signal processing for transmitting the control data input from the control section 200. The control data input to the uplink control channel processing section 2210 is any one of the downlink channel quality indicator CQI, the reception response ACK/NACK and the scheduling request SR.

The uplink control channel processing section 2210 generates signals of different forms according to the type of control data to be processed, and outputs it to the subcarrier mapping section. The type of control data to be processed is input from the control section 200 to the uplink control channel processing section 2210. The uplink pilot channel processing section 2208 generates the uplink reference signal that is a known signal in the base station apparatus 10, and outputs it to the subcarrier mapping section 2212.

The subcarrier mapping section 2212 allocates, in the subcarrier, according to an instruction from the control section 200, the signal input from the uplink pilot channel processing section 2208, the signal input from the DFT section 2206 and the signal input from the uplink control channel processing section, and outputs them to the IFFT section 2214.

The subcarrier mapping section 2212 performs the allocation of the uplink pilot channel signal within the uplink shared data channel and the allocation of the uplink pilot channel signal within the uplink control channel with time multiplexing as shown in FIG. 3, and outputs them.

The IFFT section 2214 performs inverse fast Fourier transform on the signal output by the subcarrier mapping section, and outputs it to the GI insertion section 2216.

Here, the number of points of the IFFT section 2214 is greater than the number of points of the DFT section 2206. The mobile station apparatus 20 uses the DFT section 2206, the subcarrier mapping section 2212 and the IFFT section 2214, and thereby performs the modulation of the DFT-spread-OFDM method on the signal to be transmitted using the uplink shared channel. The GI insertion section 2216 adds a guard interval to the signal input from the IFFT section 2214, and outputs the signal having the guard interval added to the transmission power control section 2218.

Based on the control signal from the control section 200, the transmission power control section 2218 controls the average transmission power on the signal input from the GI insertion section 2216, and outputs it to the element frequency band combination section 2220 of the transmission section 2226. The transmission power control section 2218 controls the average transmission power such that the average transmission power does not exceed the upper limit value of the average transmission power set by the control section 200. Specifically, the transmission power control section 2218 sets a tentative average transmission power value according to the path loss measured by the mobile station apparatus 20, the transmission power control value notified by the base station apparatus 10 to the mobile station apparatus 20, the number of uplink resource block pairs allocated to the uplink shared data channel, a modulation scheme dependent power offset value based on a modulation scheme applied to the uplink shared data channel, a reference transmission power control value notified to the mobile station apparatus 20 using the downlink shared data channel at the time of, for example, communication connection and a coefficient which is notified and transmitted to the mobile station apparatus 20 within the communication area of the base station apparatus 10 using the downlink shared data channel and by which the path loss measured by the mobile station apparatus 20 is multiplied. Then, the transmission power control section 2218 compares the upper limit value of the average transmission power in the uplink element frequency band input from the control section 200 with the tentative average transmission power value, and sets the lower value at the actually used average transmission power value.

The transmission power control section 2218 uses the following formula to set the average transmission power.

min{[the upper limit value of the average transmission power of one power amplifier],10 log$_{10}$([the number of uplink resource block pairs allocated])+[a reference transmission power control value]+[a coefficient by which path loss is multiplied]×[path loss]+[a modulation scheme dependent power offset value]+[transmission power control value]}

Here, min {A, B} indicates that A and B are compared and the lower value is selected.

The path loss is calculated based on RSRP (reference signal received power) measured from the downlink reference signal received by the mobile station apparatus 20 from the base station apparatus. The number of uplink resource block pairs allocated to the uplink shared data channel is calculated from the radio resource in the uplink shared data channel configured in the downlink control channel. The modulation scheme dependent power offset value based on the modulation scheme applied to the uplink shared data channel is previously specified by the communication system.

The per-uplink element frequency band transmission processing sections 2200 output signals to the transmission sections 2226 corresponding to the transmission antennas 225-1, 225-2 and 225-3 based on the control signal from the control section 200. The details thereof will be described later.

The element frequency band combination section 2220 combines individual signals in the uplink element frequency bands input from the per-uplink element frequency band transmission processing sections 2200, and outputs them to the D/A section 2222. Specifically, the element frequency band combination section 2220 converts the individual signals in the uplink element frequency bands input from the per-uplink element frequency band transmission processing sections 2200 into signals of an appropriate frequency.

The D/A section 2222 converts the digital signal of the baseband input from the element frequency band combination section 2220 into an analog signal, and outputs it to the transmission RF section 2224. The transmission RF section 2224 generates the in-phase component and the orthogonal component of an intermediate frequency from the analog signal input from the D/A section 2222, and removes an excess frequency component in an intermediate frequency band. Then, the transmission RF section converts (up-converts) the signal of the intermediate frequency into the signal of a high frequency to remove the excess frequency component, power-amplifies the signal with a power amplifier within the transmission RF section and transmits it to the base station apparatus 10 through the transmission antennas 225-1, 225-2 and 225-3.

When the signal is not input from the per-uplink element frequency band transmission processing sections 2200, the transmission sections 2226 stop internal processing. Some transmission sections 2226 are previously notified of the fact that the signal is not input from the per-uplink element frequency band transmission processing sections 2200, and thus stop the internal processing.

[Information Field of the Control Data in the Downlink Control Channel Indicating the Radio Resource Allocation of the Uplink Shared Data Channel]

Figures 10, 11:
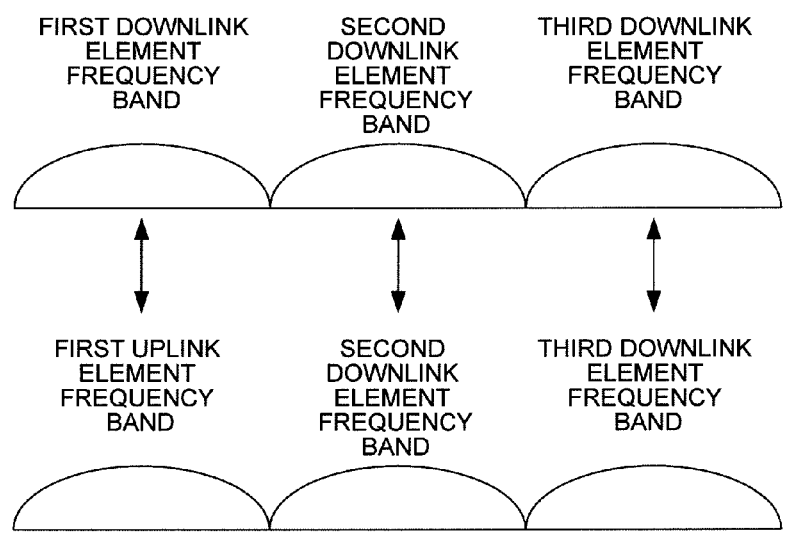
FIG. 10 is a diagram showing an information field of control data on a downlink control channel indicating the allocation of radio resources of an uplink shared data channel.
FIG. 11 is a diagram illustrating a correspondence relationship between a downlink element frequency band and an uplink element frequency band.

FIG. 10 is a diagram showing the information field of the control data in the downlink control channel indicating the radio resource allocation of the uplink shared data channel. The information field of the control data in the downlink control channel indicating the radio resource allocation of the uplink shared data channel includes information fields of "radio resource allocation information" indicating the position of the uplink resource block pair allocated within one uplink element frequency band, "modulation scheme coding rate", "a retransmission parameter" indicating the number of a redundancy version and a new data indicator, "a transmission power control value", "CRC+mobile station identifier" formed with the result of a logical operation between a cyclic redundancy check CRC that is generated from the control data and the mobile station identifier. Other information fields may be configured in the control data.

For each of the uplink element frequency bands to which the radio resource is allocated, the base station apparatus 10 transmits, to the mobile station apparatus 20, the downlink control channel including the control data shown in FIG. 10. For example, when the base station apparatus 10 allocates the radio resources of the uplink shared data channel to three uplink element frequency bands, the base station apparatus 10 transmits, to the mobile station apparatus 20, three downlink control channels including the control data indicating the radio resource allocation of the uplink shared data channel.

[Relationship Between the Downlink Element Frequency Band and the Uplink Element Frequency Band]

FIG. 11 is a diagram illustrating a correspondence relationship between the downlink element frequency band and the uplink element frequency band. Here, a description will be given of a case where three downlink element frequency bands (the first downlink element frequency band, the second downlink element frequency band and the third downlink element frequency band) are present and three uplink element frequency bands (the first uplink element frequency band, the second uplink element frequency band and the third uplink element frequency band) are present.

The downlink element frequency band and the uplink element frequency band have a one-to-one correspondence relationship. The first downlink element frequency band corresponds to the first uplink element frequency band; the second downlink element frequency band corresponds to the second uplink element frequency band; the third downlink element frequency band corresponds to the third uplink element frequency band.

The radio resource allocation of the uplink shared data channel in the downlink control channel allocated in the first downlink element frequency band indicates the radio resource allocation of the uplink shared data channel of the first uplink element frequency band; the radio resource allocation of the uplink shared data channel in the downlink control channel allocated in the second downlink element frequency band indicates the radio resource allocation of the uplink shared data channel of the second uplink element frequency band; the radio resource allocation of the uplink shared data channel in the downlink control channel allocated in the third downlink element frequency band indicates the radio resource allocation of the uplink shared data channel of the third uplink element frequency band.

[Relationship Between a Signal in the Uplink Element Frequency Band in the Transmission Mode and the Transmission Antenna]

Figure 12A:
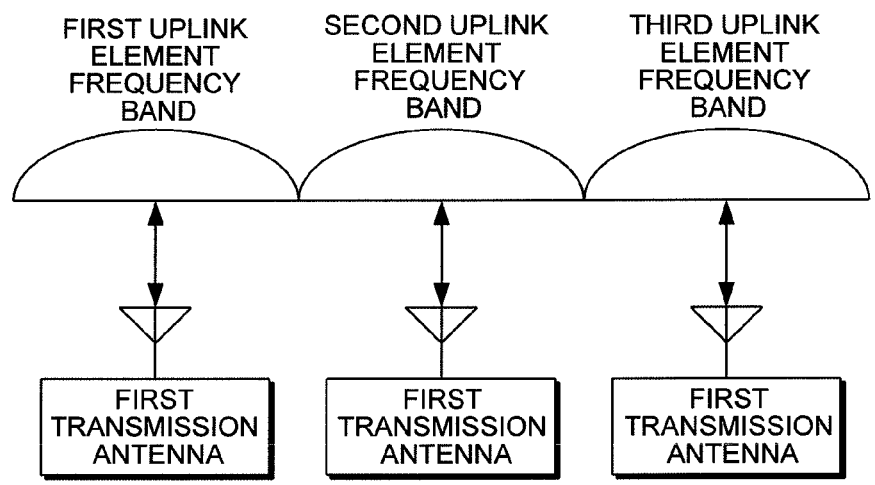
FIG. 12A is a diagram illustrating a relationship between a signal in an uplink element frequency band in each transmission mode (the first transmission mode, the second transmission mode) and a transmission antenna.
Figure 12B:
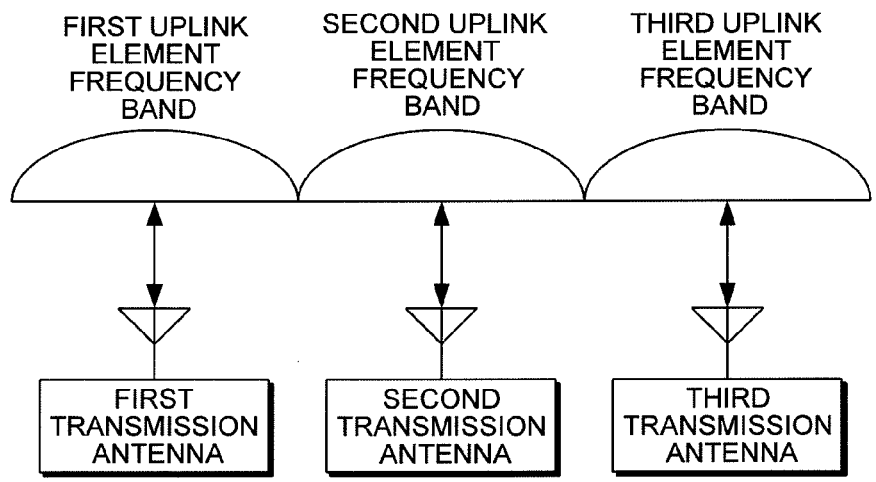
FIG. 12B is a diagram illustrating a relationship between the signal in the uplink element frequency band in each transmission mode (the first transmission mode, the second transmission mode) and the transmission antenna.
Figure 12C:
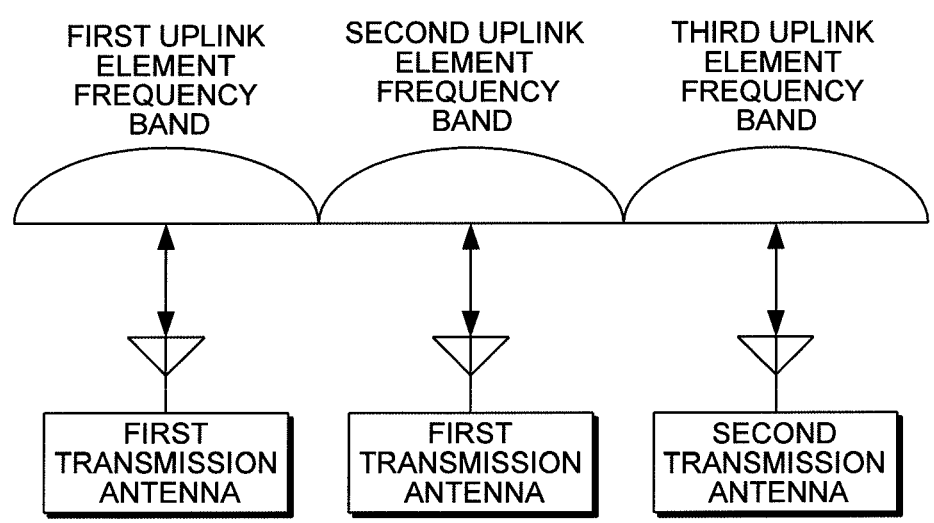
FIG. 12C is a diagram illustrating a relationship between the signal in the uplink element frequency band in each transmission mode (the first transmission mode, the second transmission mode) and the transmission antenna.

FIGS. 12A to 12C are diagrams illustrating a relationship between a signal in the uplink element frequency band in each transmission mode (the first transmission mode and the second transmission mode) and the transmission antenna. Here, a description will be given of a case where three uplink element frequency bands (the first uplink element frequency band, the second uplink element frequency band and the third uplink element frequency band) are present, and three transmission antennas (the first transmission antenna, the second transmission antenna and the third transmission antenna) are present.

The first transmission mode is a transmission mode in which the mobile station apparatus 20 uses a common transmission antenna to transmit a signal in each of the uplink element frequency bands; the second transmission mode is a transmission mode in which the mobile station apparatus 20 uses a different transmission antenna to transmit a signal in each of the uplink element frequency bands.

FIG. 12A is a diagram illustrating a relationship between a signal in the uplink element frequency band in the first transmission mode and the transmission antenna. The mobile station apparatus 20 uses the first transmission antenna to transmit a signal in the first uplink element frequency band; the mobile station apparatus 20 uses the first transmission antenna to transmit a signal in the second uplink element frequency band; the mobile station apparatus 20 uses the first transmission antenna to transmit a signal in the third uplink element frequency band. In other words, the mobile station apparatus 20 uses the common transmission antenna (the first transmission antenna) to transmit a signal in each of the uplink element frequency bands (the first uplink element frequency band, the second uplink element frequency band and the third uplink element frequency band).

More specifically, the control section 200 outputs a control signal to each processing section, and the transmission power control section 2218 within the per-uplink element frequency band transmission processing section 2200 outputs signals in the first uplink element frequency band, the second uplink element frequency band and the third uplink element frequency band to one of the transmission sections 2226, for example, the transmission section 2226 corresponding to the transmission antenna 225-1. In the element frequency band combination section 2220, the transmission section 2226 combines signals from the three per-uplink element frequency band transmission processing sections 2200, power-amplifies it and outputs it to the transmission antenna 225-1.

FIG. 12B is a diagram illustrating a relationship between a signal in the uplink element frequency band in the second transmission mode and the transmission antenna. The mobile station apparatus 20 uses the first transmission antenna to transmit a signal in the first uplink element frequency band; the mobile station apparatus 20 uses the second transmission antenna to transmit a signal in the second uplink element frequency band; the mobile station apparatus 20 uses the third transmission antenna to transmit a signal in the third uplink element frequency band. In other words, the mobile station apparatus 20 uses the different transmission antennas (the first transmission antenna, the second transmission antenna and the third transmission antenna) to transmit a signal in each of the uplink element frequency bands (the first uplink element frequency band, the second uplink element frequency band and the third uplink element frequency band).

More specifically, the control section 200 outputs a control signal to each processing section, and the transmission power control section 2218 within the per-uplink element frequency band transmission processing section 2200 outputs signals in the first uplink element frequency band, the second uplink element frequency band and the third uplink element frequency band to different transmission sections 2226, that is, to the transmission sections 2226 corresponding to the transmission antennas 225-1, 225-2 and 225-3. In the element frequency band combination section 2220, each of the transmission sections 2226 processes a signal from one per-uplink element frequency band transmission processing section 2200, power-amplifies it and outputs it to the transmission antennas 225-1, 225-2 and 225-3, respectively.

FIG. 12C is a diagram illustrating a relationship between a signal in the uplink element frequency band in a transmission mode using the first transmission mode and the second transmission mode and the transmission antenna. The mobile station apparatus 20 uses the first transmission antenna to transmit a signal in the first uplink element frequency band; the mobile station apparatus 20 uses the first transmission antenna to transmit a signal in the second uplink element frequency band; the mobile station apparatus 20 uses the second transmission antenna to transmit a signal in the third uplink element frequency band. In other words, the mobile station apparatus 20 uses the common transmission antenna (the first transmission antenna) to transmit signals in a plurality of uplink element frequency bands (the first uplink element frequency band and the second uplink element frequency band), and the mobile station apparatus 20 uses different transmission antennas (the first transmission antenna and the second transmission antenna) to transmit signals in a plurality of uplink element frequency bands (the first uplink element frequency band and the third uplink element frequency band or the second uplink element frequency band and the third uplink element frequency band).

More specifically, the control section 200 outputs a control signal to each processing section, and the transmission power control section 2218 within the per-uplink element frequency band transmission processing section 2200 outputs signals in the first uplink element frequency band and the second uplink element frequency band to the common transmission section 2226, for example, the transmission section 2226 corresponding to the transmission antenna 225-1; the transmission power control section 2218 within the per-uplink element frequency band transmission processing section 2200 outputs signals in the first uplink element frequency band and the third uplink element frequency band (or the second uplink element frequency band and the third uplink element frequency band) to different transmission sections 2226, for example, the transmission sections 2226 corresponding to the transmission antennas 225-1 and 225-2. In the element frequency band combination section 2220, each of the transmission sections 2226 combines signals from two per-uplink element frequency band transmission processing sections 2200 or processes a signal from one per-uplink element frequency band transmission processing section 2200, power-amplifies it and outputs it to the transmission antennas 225-1 and 225-2.

[Selection of the Transmission Mode]

The procedure of selecting the transmission mode by the control section 100 in the base station apparatus 10 will now be described. The control section 100 selects the transmission mode based on the average transmission power of the mobile station apparatus 20 in each of the uplink element frequency bands to which the radio resource is allocated. The mobile station apparatus 20 notifies the base station apparatus 10 of information on the remaining transmission power (Power headroom) related to the performance of each power amplifier of the mobile station apparatus 20 as a parameter related to the transmission power.

The control section 100 references the remaining transmission power per power amplifier that is the parameter related to the transmission power notified from the mobile station apparatus 20, and, if there is a remaining power in the transmission power of one power amplifier, the control section 100 uses the one power amplifier (the transmission RF section 2224 of the transmission section 2226) to select the first transmission mode in which a signal in each of the uplink element frequency bands is transmitted using the common transmission antenna. In other words, the control section 100 selects the first transmission mode when, as compared with the maximum power that can be handled by one power amplifier, the total of the average transmission power in a plurality of uplink element frequency bands is sufficient or does not exceed the maximum power.

The control section 100 references the remaining transmission power per power amplifier notified from the mobile station apparatus 20, and, if there is no remaining power in the transmission power of one power amplifier, the control section 100 uses a plurality of power amplifiers to select the second transmission mode in which a signal in each of the uplink element frequency bands is transmitted using a different transmission antenna. In other words, the control section 100 selects the second transmission mode when, as compared with the maximum power that can be handled by one power amplifier, the total of the average transmission power in a plurality of uplink element frequency bands is insufficient or exceeds the maximum power.

In consideration of the value of the average transmission power set in each of the uplink sub-frames, the control section 100 determines whether or not the power amplifier has a margin with respect to the remaining transmission power notified from the mobile station apparatus 20. Here, having a margin means that the total of the average transmission power in a plurality of uplink element frequency bands is less than the maximum power that can be handled by the power amplifier by a predetermined value. This is because, since an open loop transmission power control method and a closed loop transmission power control method are used as the transmission power control method of the mobile station apparatus 20, an error occurring between the value of the average transmission power that is estimated by the base station apparatus 10 and the value of the average transmission power that is actually set by the mobile station apparatus 20 is handled.

The control section 100 sets the numbers of transmission antennas and transmission sections used in the mobile station apparatus 20 as small as possible so that the power consumption of the mobile station apparatus 20 is reduced. According to the present embodiment, it is possible to switch between the first transmission mode in which a signal in each of the uplink element frequency bands is transmitted using the common transmission antenna according to the average transmission power in a plurality of uplink element frequency bands and the second transmission mode in which a signal in each of the element frequency bands is transmitted using a different transmission antenna, and it is possible not only to realize low power consumption by operating as few power amplifiers and the like as possible but also to realize communication quality suitable for the signal in a plurality of uplink element frequency bands.

Second Embodiment

Although, in the first embodiment, the case where the base station apparatus 10 selects the transmission mode based on the remaining transmission power in a plurality of power amplifiers and the average transmission power in a plurality of uplink element frequency bands is described, the transmission mode may be selected based on only the remaining transmission power in a plurality of power amplifiers. When one power amplifier has a small amount of remaining transmission power left, the base station apparatus 10 may select the second transmission mode in which signals in a plurality of uplink element frequency bands are transmitted using a plurality of power amplifiers and a plurality of transmission antennas whereas, when one power amplifier has a large amount of remaining transmission power left, the base station apparatus 10 may select the first transmission mode in which signals in a plurality of uplink element frequency bands are transmitted using one power amplifier and one transmission antenna.

The base station apparatus 10 may select the transmission mode based on several transmission parameters like the remaining transmission power and the uplink channel quality and the remaining transmission power and the amount of data of the uplink shared data channel. For example, when the uplink channel quality is poor with respect to the remaining transmission power that is indicated by the remaining transmission power and that can be transmitted by the mobile station apparatus 20, and the mobile station apparatus 20 is insufficient so as to transmit signals in a plurality of uplink element frequency bands with one power amplifier and one transmission antenna, the base station apparatus 10 selects the second transmission mode whereas, when the uplink channel quality is satisfactory with respect to the remaining transmission power that can be transmitted by the mobile station apparatus 20, and the mobile station apparatus 20 is sufficient so as to transmit signals in a plurality of uplink element frequency bands with one power amplifier and one transmission antenna, the base station apparatus 10 selects the first transmission mode.

When a large amount of data on the remaining transmission power that is indicated by the remaining transmission power and that can be transmitted by the mobile station apparatus 20 is transmitted, a large amount of transmission power is further required and the mobile station apparatus 20 is insufficient so as to transmit signals in a plurality of uplink element frequency bands with one power amplifier and one transmission antenna, the base station apparatus 10 selects the second transmission mode whereas, when a large amount of data on the remaining transmission power that can be transmitted by the mobile station apparatus 20 is not transmitted, a large amount of transmission power is not further required and the mobile station apparatus 20 is sufficient so as to transmit signals in a plurality of uplink element frequency bands with one power amplifier and one transmission antenna, the base station apparatus 10 selects the first transmission mode.

The base station apparatus 10 may select the transmission mode based not on the remaining transmission power but on the path loss. When the path loss of the mobile station apparatus 20 is more than a predetermined value, the base station apparatus 10 selects the second transmission mode whereas, when the path loss of the mobile station apparatus 20 is less than the predetermined value, the base station apparatus 10 selects the first transmission mode. In this configuration, the mobile station apparatus 20 in a cell edge (cell boundary) basically uses the second transmission mode using a plurality of transmission antennas to transmit signals in a plurality of uplink element frequency bands, and the mobile station apparatus 20 in a cell center uses the second transmission mode using a small number of transmission antennas as compared with the mobile station apparatus 20 in the cell edge or the first transmission mode using one transmission antenna to transmit signals in a plurality of uplink element frequency bands. With this configuration, the change of the transmission mode on variations in the number of uplink element frequency bands used in the uplink shared data channel is reduced, and thus it is possible to construct a stable communication system.

Third Embodiment

Furthermore, the mobile station apparatus 20 performs different types of transmission power control based on the transmission modes. More specifically, when the control section 200 selects the first transmission mode, the transmission power control section 2218 sets the upper limit value of the average transmission power in the uplink element frequency bands to a small value as compared with a case where the control section 200 selects the second transmission mode.

As, in the first transmission mode, the number of uplink element frequency bands that are simultaneously used for transmission of signals is increased, the transmission power control section 2218 may set the upper limit value of the average transmission power in the uplink element frequency bands to a smaller value.

Thus, it is possible to make an input value to the power amplifier within the transmission RF section an appropriate value. Since, in the second transmission mode, signals in the uplink element frequency bands are transmitted with the transmission antennas of different power amplifiers, the signals in the uplink element frequency bands are single carrier signals in the DFT-S-OFDM method. Since, in the first transmission mode, signals in the uplink element frequency bands are transmitted with the transmission antenna of a common power amplifier, the signals in the uplink element frequency bands are multicarrier signals in the N×DFT-S-OFDM method.

As compared with the signal carrier signals in the DFT-S-OFDM method, in the multicarrier signals in the N×DFT-S-OFDM method, a PAPR (peak-to-average power ratio) is increased. When the input value of a signal to the power amplifier exceeds the capacity of the power amplifier, the waveform of the transmission signal is distorted, and thus the mobile station apparatus 20 cannot transmit an appropriate signal.

In view of the foregoing problem, the transmission power control section 2218 sets the upper limit value of the average transmission power in the uplink element frequency bands to a different value based on the transmission mode selected by the control section 200. More specifically, as compared with a case where the second transmission mode is selected, when the first transmission mode is selected, the upper limit value of the average transmission power in the uplink element frequency bands is set to a small value, and thus it is possible to reduce the conditions in which, when the first transmission mode is selected, the transmission signal becomes the multicarrier signal, the PAPR of the transmission power is increased, the dynamic range of the transmission power is extended and the input value to the power amplifier within the transmission RF section exceeds the capacity of the power amplifier.

As, in the first transmission mode, the number of uplink element frequency bands that are simultaneously used for transmission of signals is increased, the transmission power control section 2218 sets the upper limit value of the average transmission power in the uplink element frequency bands to a smaller value. Thus, it is possible to appropriately control the input value to the power amplifier such that the input value falls within the range of the capacity of the power amplifier, in consideration of variations in the PAPR of the transmission power that is changed as the number of uplink element frequency bands used simultaneously is increased.

Fourth Embodiment

Although, in the embodiment described above, the case where the base station apparatus 10 transmits the information on the transmission mode to the mobile station apparatus 20 using the downlink shared data channel has been described, it is possible to transmit the information on the transmission mode using the downlink control channel.

The base station apparatus 10 applies scrambling to the cyclic redundancy check configured in the downlink control channel, actually arranges, in the downlink control channel, the results of an logical operation between the cyclic redundancy check in which the scrambling is performed and a mobile station identifier, and transmits them.

Here, in the scrambling, a scrambling code unique to the transmission antenna of the mobile station apparatus 20 is used. When the first transmission mode is applied to the mobile station apparatus 20, the base station apparatus 10 applies a common scrambling code to each of the downlink control channels including radio resource allocation information on the uplink shared data channel in each of the uplink element frequency bands. When the second transmission mode is applied to the mobile station apparatus 20, the base station apparatus 10 applies a different scrambling code to each of the downlink control channels including radio resource allocation information on the uplink shared data channel in each of the uplink element frequency bands.

The mobile station apparatus 20 previously recognizes a set of scrambling codes applied to the own apparatus. The mobile station apparatus 20 detects the downlink control channel transmitted to the own apparatus. The mobile station apparatus 20 detects the downlink control channel including the radio resource allocation information on the uplink shared data channel in a plurality of the uplink element frequency bands; when the common scrambling code is applied to each of the downlink control channel, the mobile station apparatus 20 selects the first transmission mode and transmits a signal in each of the uplink element frequency bands using the common transmission antenna whereas, when a different scrambling code is applied to each of the downlink control channels, the mobile station apparatus 20 selects the second transmission mode, and transmits the signal in each of the uplink element frequency bands using a different transmission antenna.

When the reception processing section 210 of the mobile station apparatus 20 detects the downlink control channel transmitted to the own apparatus, the information on the scrambling code applied together with the control data is also output to the control section 200. The control section 200 performs the processing for selecting the transmission antenna mode based on the scrambling code input from the reception processing section 210.

Fifth Embodiment

Although, in the embodiment described above, the case where the base station apparatus 10 selects the transmission mode based on the remaining transmission power notified from the mobile station apparatus 20 and the average transmission power set by the mobile station apparatus 20 has been described, the mobile station apparatus 20 may select the transmission mode.

The control section 200 of the mobile station apparatus 20 manages and grasps the remaining transmission power of the power amplifier within the transmission RF section 2224 of each of the transmission sections 2226. The control section 200 selects the transmission mode based on the average transmission power in each of the uplink element frequency bands controlled by the transmission power control section 2218 and the remaining transmission power. The details of the method of selecting the transmission mode by the mobile station apparatus 20 are the same as those of the method of selecting the transmission mode by the base station apparatus 10 described above.

Sixth Embodiment

Although, in the embodiment described above, the case where the downlink element frequency band and the uplink element frequency band have a one-to-one correspondence relationship, and the downlink control channel including the radio resource allocation of the uplink shared data channel allocated in the downlink element frequency band represents the uplink shared data channel allocated in the corresponding uplink element frequency band has been described, another configuration may be used. For example, a configuration may be used in which the number of the uplink element frequency band corresponding to the downlink control channel is included, and the downlink control channel including the radio resource allocation of the uplink shared data channel can be allocated in any of the downlink element frequency bands.

[A Program, a Recording Medium and the Like]

A program that is operated in the mobile station apparatus according to the present invention is a program (a program makes a computer function) that controls a CPU or the like so as to achieve the functions of the above embodiments according to the present invention. Information handled by these apparatuses is temporarily stored in a RAM when it is processed, is then stored in various ROMs and a HDD, is read by the CPU as necessary and is changed and written.

The recording medium storing the program may be any one of a semiconductor medium (for example, a ROM and a nonvolatile memory card), an optical recording medium (for example, a DVD, an MO, an MD, a CD and a BD), a magnetic recording medium (for example, a magnetic tape and a flexible disc) and the like. The program loaded is executed and thus the functions of the embodiments described above are achieved, and, in addition, based on an instruction from the program, processing is performed in cooperation with an operating system or other application programs and the like and thus the functions of the present invention may be achieved.

When the program is distributed on the market, the program can be stored in a transportable recording medium and be distributed or can be transferred to a server computer that is connected through a network such as the Internet. In this case, a recording device of the server computer is included in the present invention.

Although the embodiments of the present invention have been described in detail above with reference to the drawings, the specific configuration thereof is not limited to these embodiments, and the scope of design and the like without departing from the spirit of the present invention are also included in the scope of claims.

DESCRIPTION OF SYMBOLS

1 Wireless communication system
2 Base station apparatus
20-1, 20-2 and 20-3 Mobile station apparatus
100 and 200 Control section
110 and 220 Transmission processing section
115 Transmission antenna
210 Reception processing section
2226 Transmission section

The invention claimed is:

1. A mobile station apparatus that performs wireless communication with a base station apparatus using a plurality of element frequency bands having a predetermined frequency bandwidth, the mobile station apparatus comprising:
   a plurality of transmission sections, each transmission section includes a different transmission antenna and a power amplifier;
   a transmission processing section that generates a transmission signal using a radio resource of said plurality of element frequency bands, and outputs said generated transmission signal to at least one of said transmission sections based on information indicating any one of a first transmission mode in which signals in the respective element frequency bands are transmitted using one of the different transmission antennas and a second transmission mode in which signals in the respective element frequency bands are transmitted using the different transmission antennas respectively; and
   a control section that selects said first transmission mode when a total of average transmission powers set on said respective element frequency bands does not exceed the maximum power of any one of the power amplifiers, and that, on the other hand, selects said second transmission mode when the total of average transmission powers exceeds the maximum power of any one of the power amplifiers,
   wherein the transmission signal is wirelessly transmitted to said base station apparatus in any one of said first transmission mode and said second transmission mode, and
   wherein the average transmission power is
   $10 \log_{10}$ ([the number of uplink resource block pairs allocated])+[a reference transmission power control value]+[a coefficient by which path loss is multiplied]×[path loss]+[a modulation scheme dependent power offset value]+[transmission power control value].

2. The mobile station apparatus of claim 1, further comprising a control section that measures a remaining transmission power of said plurality of power amplifiers,
   wherein said transmission section wirelessly transmits information indicating said remaining transmission power to said base station apparatus.

3. The mobile station apparatus of claim 1, further comprising a transmission power control section that performs, on said respective element frequency bands, transmission power control corresponding to said first transmission mode or said second transmission mode.

4. The mobile station apparatus of claim 3, wherein said transmission power control section sets an upper limit value of average transmission power of said respective power amplifiers to a different value according to said first transmission mode or said second transmission mode.

5. The mobile station apparatus of claim 4, wherein, when, in said first transmission mode, the transmission signal is wirelessly transmitted to said base station apparatus, said transmission power control section sets the upper limit value of the average transmission power to be smaller than that in said second transmission mode.

6. The mobile station apparatus of claim 1, wherein the control section selects said first transmission mode when, in scrambling included in downlink control information and applied to a cyclic redundancy check, a scrambling code applied to the downlink control information on each of the element frequency bands received from said base station apparatus is common in said respective element frequency bands, and that, on the other hand, selects said second transmission mode when the scrambling code is different in said respective element frequency bands,
wherein the transmission signal is wirelessly transmitted to said base station apparatus in any one of said selected first transmission mode and second transmission mode.

7. A base station apparatus that performs wireless communication with a mobile station apparatus using a plurality of element frequency bands having a predetermined frequency bandwidth, the base station apparatus comprising:
a reception processing section that receives a signal transmitted from said mobile station apparatus using a radio resource of the plurality of element frequency bands;
a base station side control section that selects, based on a parameter with respect to transmission power notified from said mobile station apparatus, any one of a first transmission mode in which signals in the respective element frequency bands are transmitted using a single transmission antenna of said mobile station and a second transmission mode in which signals in the respective element frequency bands are transmitted using a plurality of different transmission antennas of said mobile station respectively,
said control section selects said first transmission mode when a total of average transmission powers set on said respective element frequency bands does not exceed the maximum power of any one of power amplifiers of the transmission antennas, and that, on the other hand, selects said second transmission mode when the total of average transmission powers exceeds the maximum power of any one of the power amplifiers, wherein the average transmission power is
$10 \log_{10}$ ([the number of uplink resource block pairs allocated])+[a reference transmission power control value]+[a coefficient by which path loss is multiplied]× [path loss]+[a modulation scheme dependent power offset value]+[transmission power control value]; and
a base station side transmission section that wirelessly transmits, to said mobile station apparatus, information indicating any one of said selected first transmission mode and second transmission mode.

8. The base station apparatus of claim 7, wherein the parameter with respect to said transmission power is a remaining transmission power of a plurality of power amplifiers included in said mobile station apparatus.

9. The base station apparatus of claim 8, wherein said control section selects said first transmission mode when a total of average transmission powers for the plurality of element frequency bands set based on said remaining transmission power in said mobile station apparatus does not exceed the maximum power of any one of the power amplifiers whereas said control section selects said second transmission mode when the total of said average transmission powers exceeds the maximum power of any one of the power amplifiers.

10. A communication system in which a mobile station apparatus and a base station apparatus perform wireless communication using a plurality of element frequency bands having a predetermined frequency bandwidth,
wherein said base station apparatus comprises:
a reception processing section that receives a signal transmitted from said mobile station apparatus using a radio resource of the plurality of element frequency bands;
a base station side control section that selects any one of a first transmission mode in which signals in the respective element frequency bands are transmitted using a single transmission antenna and a second transmission mode in which signals in the respective element frequency bands are transmitted using a plurality of different transmission antennas respectively, based on a parameter with respect to transmission power notified from said mobile station apparatus,
said base station side control section selects said first transmission mode when a total of average transmission powers set on said respective element frequency bands does not exceed the maximum power of any one of power amplifiers of the transmission antennas, and that, on the other hand, selects said second transmission mode when the total of average transmission powers exceeds the maximum power of any one of the power amplifiers, wherein the average transmission power is
$10 \log_{10}$ ([the number of uplink resource block pairs allocated])+[a reference transmission power control value]+[a coefficient by which path loss is multiplied]× [path loss]+[a modulation scheme dependent power offset value]+[transmission power control value]; and
a base station side transmission section that wirelessly transmits, to said mobile station apparatus, information indicating any one of said selected first transmission mode and second transmission mode,
wherein said mobile station apparatus comprises:
a plurality of transmission sections, each transmission section including a transmission antenna and a power amplifier; and
a transmission processing section that outputs said generated transmission signal to at least one of said transmission sections based on information indicating any one of said first transmission mode and second transmission mode, and
wherein said mobile station apparatus wirelessly transmits, to said base station apparatus, the transmission signal in any one of said first transmission mode and said second transmission mode.

11. A communication method of a communication system in which a mobile station apparatus and a base station apparatus perform wireless communication using a plurality of element frequency bands having a predetermined frequency bandwidth, the communication method comprising the steps of:

in said base station apparatus receiving a signal transmitted from said mobile station apparatus using a radio resource of the plurality of element frequency bands;

selecting, based on a parameter with respect to transmission power notified from said mobile station apparatus, any one of a first transmission mode in which signals in the respective element frequency bands are transmitted using a single transmission antenna of said mobile station apparatus and a second transmission mode in which signals in the respective element frequency bands are transmitted using a plurality of different transmission antennas of said mobile station apparatus respectively, said selecting selects said first transmission mode when a total of average transmission powers set on said respective element frequency bands does not exceed the maximum power of any one of power amplifiers of the transmission antennas, and that, on the other hand, selects said second transmission mode when the total of average transmission powers exceeds the maximum power of any one of the power amplifiers, wherein the average transmission power is $10 \log_{10}$ ([the number of uplink resource block pairs allocated])+[a reference transmission power control value]+[a coefficient by which path loss is multiplied]×[path loss]+[a modulation scheme dependent power offset value]+[transmission power control value]; and wirelessly transmitting, to said mobile station apparatus, information indicating any one of said selected first transmission mode and second transmission mode, and in said mobile station apparatus outputting said generated transmission signal to at least one of said transmission sections based on information indicating any one of said first transmission mode and second transmission mode, and wirelessly transmitting, to said base station apparatus, the transmission signal in any one of said first transmission mode and said second transmission mode.

12. A mobile station apparatus that performs wireless communication with a base station apparatus using a plurality of element frequency bands having a predetermined frequency bandwidth, the mobile station apparatus including a non-transitory computer-readable medium having instructions stored thereon, such that when the instructions are read and executed by a processor, the processor is configured to perform the steps of:

generating a transmission signal using a radio resource of said plurality of element frequency bands and outputs said generated transmission signal to at least one of said transmission sections, based on information indicating any one of a first transmission mode in which signals in the respective element frequency bands are transmitted using a single transmission antenna of said mobile station apparatus and a second transmission mode in which signals in the respective element frequency bands are transmitted using a plurality of different transmission antennas of said mobile station apparatus respectively, selecting said first transmission mode when a total of average transmission powers set on said respective element frequency bands does not exceed the maximum power of any one of power amplifiers of the transmission antennas, and, on the other hand, selecting said second transmission mode when the total of average transmission powers exceeds the maximum power of any one of the power amplifiers, wherein the average transmission power is $10 \log_{10}$ ([the number of uplink resource block pairs allocated])+[a reference transmission power control value]+[a coefficient by which path loss is multiplied]×[path loss]+[a modulation scheme dependent power offset value]+[transmission power control value], and processing in which a transmission section wirelessly transmitting the transmission signal to said base station apparatus in any one of said first transmission mode and said second transmission mode.

\* \* \* \* \*